(12) United States Patent
Bergantino et al.

(10) Patent No.: US 9,864,960 B2
(45) Date of Patent: Jan. 9, 2018

(54) MANUFACTURING COLLABORATION HUB DATA EXCHANGE INTERFACE

(75) Inventors: Stefano Bergantino, Rome (IT); Marco Irione, Rome (IT); Andrea Giammusso, Rome (IT)

(73) Assignee: Accenture Global Services Limited, Dublin (IE)

( * ) Notice: Subject to any disclaimer, the term of this patent is extended or adjusted under 35 U.S.C. 154(b) by 1080 days.

(21) Appl. No.: 12/422,059

(22) Filed: Apr. 10, 2009

(65) Prior Publication Data
US 2010/0153154 A1 Jun. 17, 2010

(30) Foreign Application Priority Data

Dec. 17, 2008 (EP) .................................. 08425796

(51) Int. Cl.
*G06Q 10/00* (2012.01)
*G06Q 10/06* (2012.01)

(52) U.S. Cl.
CPC ........... *G06Q 10/06* (2013.01); *G06Q 10/063* (2013.01)

(58) Field of Classification Search
CPC ....... G06Q 10/063; G06Q 10/06; G06F 17/30
USPC ...................................................... 705/7.11
See application file for complete search history.

(56) References Cited

U.S. PATENT DOCUMENTS

| | | | |
|---|---|---|---|
| 6,308,178 B1 * | 10/2001 | Chang et al. | |
| 6,665,575 B2 | 12/2003 | Betawar et al. | |
| 6,697,690 B2 | 2/2004 | Scholl et al. | |
| 6,907,308 B1 | 6/2005 | Bartlett et al. | |
| 7,240,324 B2 * | 7/2007 | Casati ..................... | G06F 9/542 |
| | | | 709/248 |
| 7,356,558 B2 * | 4/2008 | Luce et al. ..................... | 709/201 |
| 7,653,562 B2 * | 1/2010 | Schulz et al. ................ | 705/7.27 |
| 7,792,693 B2 * | 9/2010 | Bultmeyer et al. .......... | 705/7.26 |
| 7,865,767 B2 * | 1/2011 | Honda et al. .................. | 714/6.3 |
| 7,904,817 B2 | 3/2011 | Bergantino et al. | |
| 2002/0042756 A1 * | 4/2002 | Kumar et al. .................. | 705/26 |
| 2002/0049622 A1 * | 4/2002 | Lettich et al. .................... | 705/7 |
| 2003/0195763 A1 * | 10/2003 | Gulcu et al. ..................... | 705/1 |

(Continued)

FOREIGN PATENT DOCUMENTS

| | | |
|---|---|---|
| CN | 1858797 | 11/2006 |
| CN | 101030274 | 9/2007 |

(Continued)

OTHER PUBLICATIONS

Hollingsworth, David, "Workflow Management Coalition the Worfklow Reference Model", Jan. 2995, pp. 55.*

(Continued)

*Primary Examiner* — Maria C Santos-Diaz
(74) *Attorney, Agent, or Firm* — Brinks Gilson & Lione

(57) ABSTRACT

A data exchange system provides an efficient and cost effective way to control and monitor the manufacturing processes of multiple logistics plants in a virtual manufacturing network. The data exchange system provides a way to quickly and efficiently implement a virtual manufacturing network that includes multiple logistic plants and an electronic production execution system. The data exchange system and electronic production execution system together form a manufacturing collaboration hub that unifies internal and external manufacturing processes of multiple logistic plants to implement a virtual manufacturing network.

21 Claims, 13 Drawing Sheets

(56) References Cited

U.S. PATENT DOCUMENTS

| | | | |
|---|---|---|---|
| 2004/0015269 A1 | 1/2004 | Jungmann et al. | |
| 2004/0078107 A1 | 4/2004 | Chou et al. | |
| 2004/0078182 A1* | 4/2004 | Nixon et al. | 703/22 |
| 2004/0083448 A1 | 4/2004 | Schulz | |
| 2004/0117377 A1* | 6/2004 | Moser et al. | 707/10 |
| 2005/0038565 A1 | 2/2005 | Power et al. | |
| 2007/0118597 A1* | 5/2007 | Fischer et al. | 709/204 |
| 2007/0156485 A1* | 7/2007 | Sanabria | G06Q 10/06 705/7.26 |
| 2007/0156500 A1* | 7/2007 | Merkel et al. | 705/9 |
| 2008/0168082 A1* | 7/2008 | Jin | G06F 8/20 |
| 2008/0270977 A1* | 10/2008 | Nucci et al. | 717/105 |
| 2009/0319535 A1* | 12/2009 | Webber et al. | 707/10 |

FOREIGN PATENT DOCUMENTS

| | | |
|---|---|---|
| CN | 101101647 | 1/2008 |
| WO | WO 01/04748 A1 | 1/2001 |
| WO | WO 03/032095 A2 | 4/2003 |

OTHER PUBLICATIONS

United States Patent and Trademark Office Action dated Feb. 23, 2009 for corresponding U.S. Appl. No. 11/657,993.

European Patent Office Search Report dated Mar. 21, 2007 for corresponding EPO Application No. 06425816.3.

Vitharana et al., "Knowledge-Based Repository Scheme for Storing and Retrieving Business Components: A Theoretical Design and an Empirical Analysis", *IEEE Transactions on Software Engineering*, vol. 29, No. 7, pp. 649-664, New York, NY, Jul. 2003.

Meyer-Wegener et al., "Conceptual Workflow Schemas", *Cooperative Information Systems*, 1999 IFCIS International Conference, IEEE Computer Society, Sep. 2, 1999, pp. 234-242.

European Patent Office Action dated Aug. 6, 2009 for co-pending European Patent Office Application No. 08425796.3.

"Statement in Accordance with the Notice from the European Patent Office dated Oct. 1, 2007 Concerning Business Methods," Journal of the European Patent Office, Nov. 1, 2007, pp. 592-593.

Official Communication dated Dec. 6, 2012 for co-pending European Patent Office Application No. 08 425 796.3.

Examiner's First Report on Patent Application dated Oct. 12, 2010 for co-pending Australian Application No. 2009250974.

Notification of the First Office Action dated Nov. 9, 2011 for co-pending Chinese Application No. 200910220838.0.

Canadian Office Action, dated Feb. 12, 2014, pp. 1-4, Canadian Intellectual Property Office, Gatineau, Quebec.

Canadian Office Action, dated Dec. 18, 2014, pp. 1-7, issued in Canadian Patent Application No. 2,681,699, Canadian Intellectual Property Office, Gatineau, Quebec.

* cited by examiner

MANUFACTURING COLLABORATION HUB DATA EXCHANGE INTERFACE

BACKGROUND OF THE INVENTION

1. Priority Claim

This application claims the benefit of priority to filed in the European Patent Office on Dec. 17, 2008 and assigned Serial No. 8425796.3.

2. Technical Field

This disclosure concerns quickly and efficiently implementing a virtual manufacturing network. In particular, this disclosure relates to an efficient and cost effective way to control and monitor the manufacturing processes of multiple geographically separated logistics plants using an electronic production execution system and a data exchange system to implement a virtual manufacturing network.

3. Background Information

In many manufacturing industries, stringent regulation is a key issue. Stringent regulation is a particularly key issue regarding the processes and functions associated with the development, production, and marketing of pharmaceutical products and processed food products. Very strict rules and regulations have been shaped by industry regulatory bodies for such products. Particularly, very strict laws are applied in different countries regarding the development and production of chemical drugs. Indeed, the pharmaceutical industry demands absolute accuracy, and the highest quality standards, together with production flexibility and high productivity. As a consequence, the costs continue to rise to establish accurate documented evidence that provides a high degree of assurance of consistent production. The costs to consistently produce a product that meets predetermined specifications, and quality attributes continue to increase.

Accordingly, many companies are interested in improving and identifying alternatives to the cumbersome manual processes employed to compile batch records during production. Conventionally, paper documentation is widely used to record all the batch information produced across a specific lifecycle. Batch recording procedures are used that are based on conventional information systems referred to as electronic batch record systems (EBRS). Such systems are typically integrated into a conventional enterprise resource planning (ERP) system employing very complex interfaces. Using such systems moves the complexity of conventionally known paper methods of compiling batch records during production from the production cycle to the Information Technology (IT) department, which has the responsibility of integrating various requisite systems. The costs of developing and maintaining such interfaces are very high. Furthermore, conventional record keeping does not address the significant challenges that exist to allowing a company to maintain consistent control and production excellence among multiple geographically disbursed logistics plants. In other words, typical paper based reporting rendered the individual logistics plants difficult to monitor, control, and guide to ensure consistently produced products worldwide.

Therefore, a need exists to address the problems noted above and other previously experienced.

SUMMARY

The manufacturing collaboration hub (MCHub) data exchange module (DEM) provides an interface to harmonize manufacturing standards and processes across a geographically disbursed enterprise and thereby enable the integration of production sites. The DEM provides a way to validate production, govern production execution, and enable quality assurance. The DEM also provides a way to augment and sustain a "virtual supply chain" and extends manufacturing excellence systems to the production plants of an organization and external contractor manufacturers. DEM establishes the integration between production plants (e.g., logistic plants (LP)) and a virtual manufacturing network. The DEM and the virtual manufacturing network together implement functionality of the MCHub that provides a portable and networked virtual plant that supports manufacturing execution processes, interfaces to production plants, and allows future extensions of the virtual manufacturing network capabilities to third party manufacturers to improve data integration and monitoring the quality of manufacturing activities. In other words, a user is relieved from the mental task of determining reporting for individual logistics plants. Consequently, the man-machine interaction is improved, for example in that the data exchange method and system makes monitoring, controlling, and guiding reporting data easier and more efficient and ensures consistently produced products worldwide.

The MCHub implements a virtual manufacturing network that unifies multiple logistic plants (e.g., production plants) into a central manufacturing hub that integrates the manufacturing processes of the logistic plants. In this way a company may improve quality control for the production processes in manufacturing and compliance with the manufacturing and regulatory requirements of the industry. The MCHub (e.g., virtual manufacturing network) may include an electronic production execution system (ePES). The MCHub DEM connects production plants (e.g., internal and external production plants) with the virtual manufacturing network in order to adapt, integrate and control manufacturing processes and ensure compliance with quality and production requirements in real-time.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

BRIEF DESCRIPTION OF THE DRAWINGS

The process system and method is described by example in the following enclosed figures. Specific features described in the figures are examples that may be arbitrarily combined with each other.

DETAILED DESCRIPTION

Figure 1:
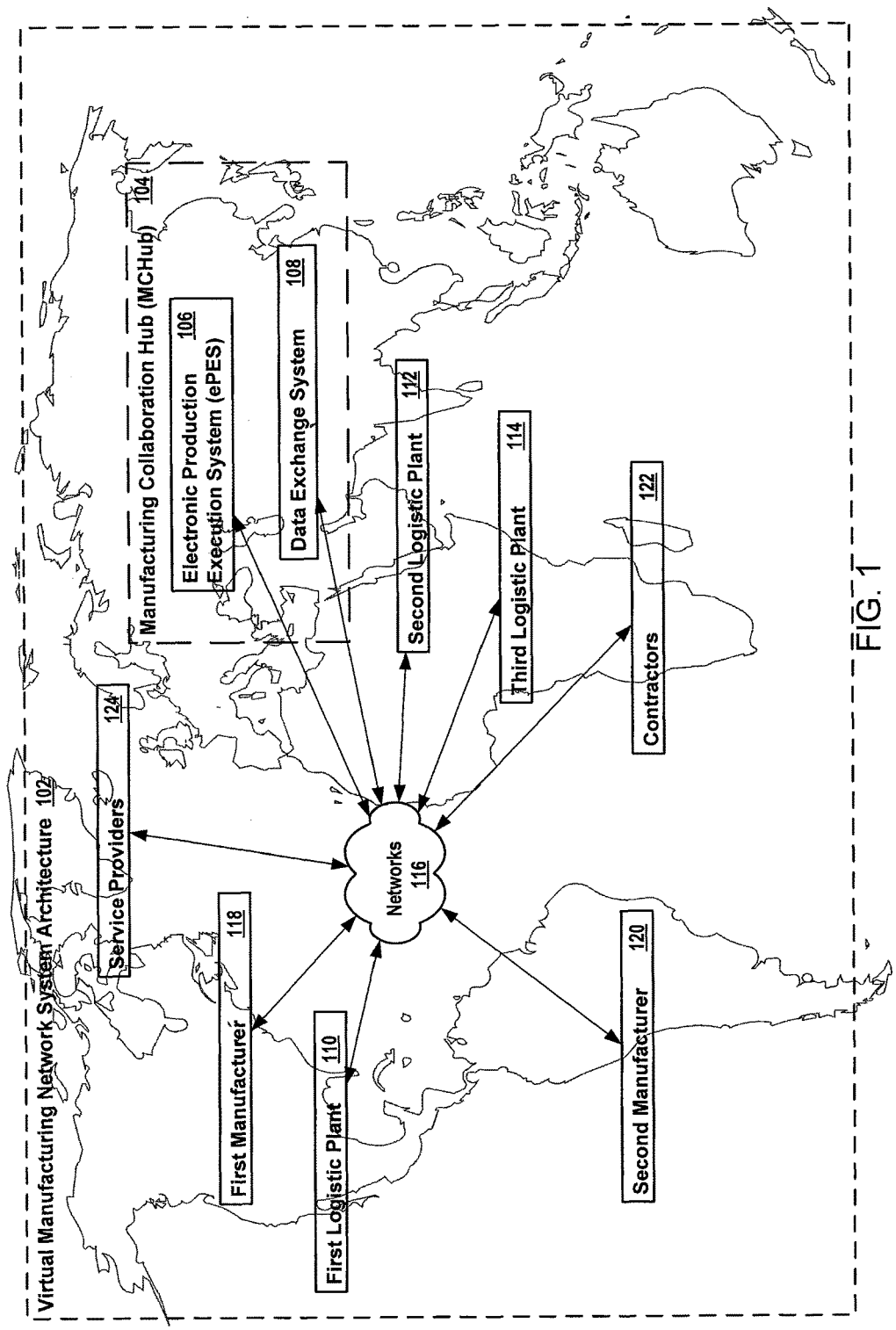
FIG. 1 illustrates a virtual manufacturing network (VMN) system architecture.

FIG. 1 illustrates a virtual manufacturing network (VMN) system architecture 102. The VMN system architecture 102 includes a manufacturing collaboration hub (MCHub) 104 that implements a virtual manufacturing network. The MCHub may include an electronic production execution system 106 and a data exchange system (DES) 108. The electronic production execution system may be the "ePES" described in more detail in European Patent Application serial no. EP 06425816.3 entitled "Method for Controlling and/or Monitoring Data Processing Device and Computer Program", filed on Dec. 1, 2006. However, other production execution systems may also be used, and specific references below to ePES are used as examples without limitation of the architecture 102 to use with ePES specifically. The MCHub 104 communicates with the various components of the VMN system architecture 102 through networks 116 (e.g., the Internet, local area networks, wide area networks, or other networks whether proprietary and internal to the company, public, or a combination of both). The VMN system architecture 102 includes multiple logistic plants (e.g., the LPs 110, 112 and 114) that may employ enterprise resource planning (ERP) systems.

The logistic plants (e.g., 110, 112 and 114), ePES 106 and DES 108 may be geographically disbursed without regard to the location of other components of the VMN system architecture 102. In one implementation, ePES 106 and DES 108 are geographically co-located. The VMN system architecture 102 may further include manufacturers (e.g., 118 and 120) and contractors 122 that own and/or operate the logistic plants (e.g., 110, 112 and 114). In one implementation, the logistic plants belong to contractors 122 that contract with one or more of the manufacturers (e.g., 118 and 120). In another implementation, MCHub 104 belongs to a service provider 124, while the logistics plants (e.g., 110, 112 and 114) belong to some combination of contractors 122 and/or manufacturers (e.g., 118 and 120).

Figure 2:
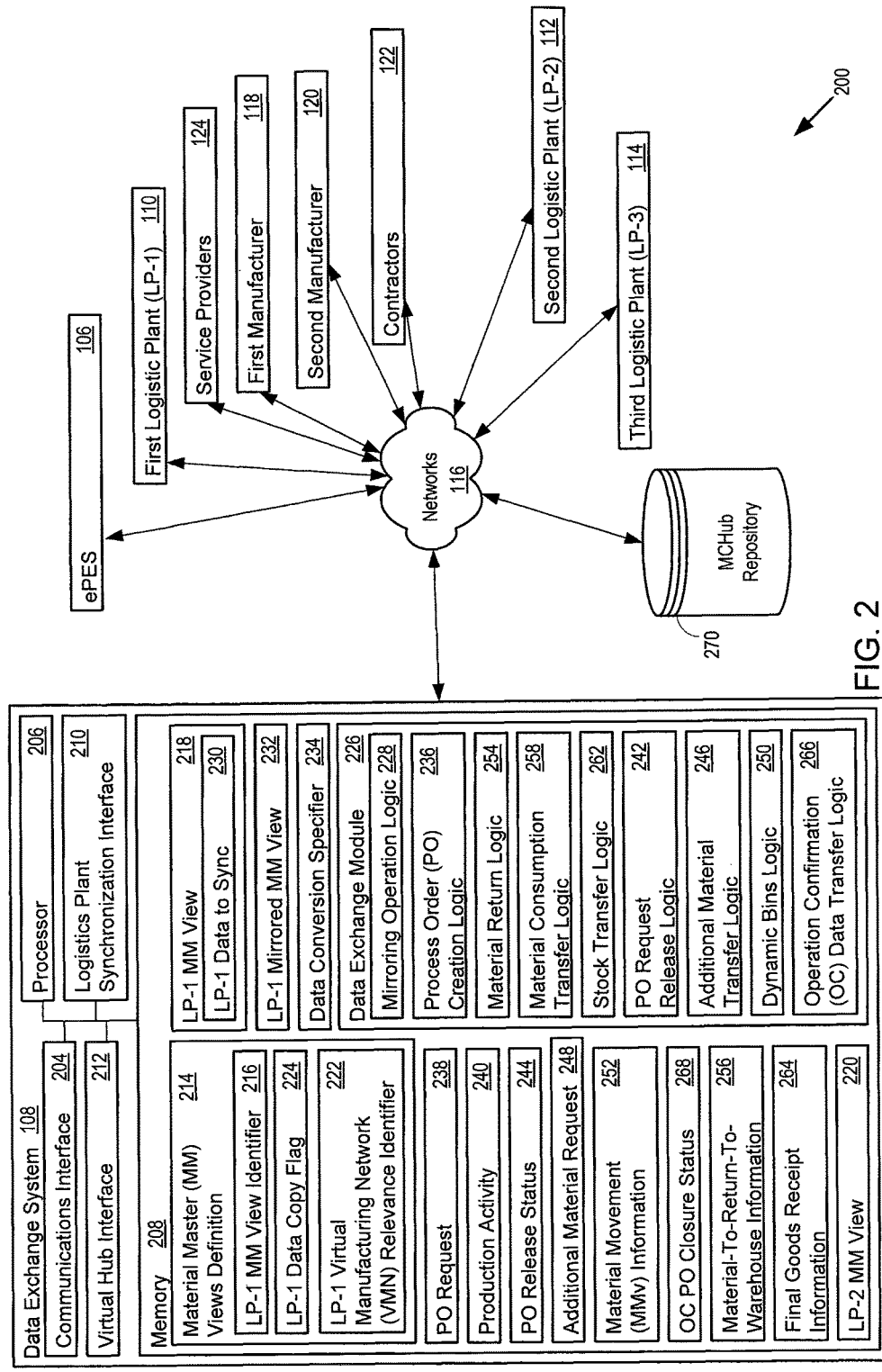
FIG. 2 shows a data exchange system of a virtual manufacturing network (VMN) system architecture.

FIG. 2 shows a data exchange system (DES) 108 of the VMN system architecture 102. DES 108 comprises a communications interface 204 that DES 108 uses to communicate with the various components of the VMN system architecture 102 through the networks 116, as well as a processor 206 and a memory 208.

In one implementation, DES 108 includes a logistics plant synchronization interface 210 that connects to multiple logistics plants (e.g., 110, 112 and 114) and a virtual hub interface 212 that connects to the centralized MCHub 104 that implements the virtual manufacturing network for the multiple logistics plants (e.g., 110, 112 and 114). The interfaces 210 and 212 may be hardware or software interfaces, or may be implemented in a combination of hardware and software. Furthermore, the interfaces may be shared between the LPs 110-114 and the MCHub 104, such as by using the same Ethernet adapter to communicate data between the LPs 110-114, MCHUB 104, and the DES 108. As described in more detail below, the memory 208 includes a material master views definition 214 that specifies a material master view identifier 216 for a logistics plant material master view (e.g., 218 and 220), a virtual manufacturing network relevance identifier 222 for the material master view identifier 216, and a logistic plant data copy flag 224 for the material master view identifier 216. The material master views definition 214 may also be shared with the LPs or other entities in the architecture 102 in order to facilitate data mirroring operations, as explained below.

The memory 208 further includes a data exchange module (DEM) 226 that analyzes the virtual manufacturing network relevance identifier 222 to determine whether the logistics plant material master view is relevant. For example, when the logistics plant material master view (e.g., 218 and 220) is determined to be relevant, the DEM 226 analyzes the logistic plant data copy flag 224 to determine when to initiate a mirroring operation (e.g., mirroring operation logic 228). The mirroring operation (e.g., mirroring operation logic 228) may include synchronizing data (e.g., LP data to sync 230) in the logistics plant material master view (e.g., 218 and 220) received by DES 108 through the logistics plant synchronization interface 210 from an originating logistics plant from among the multiple logistics plants (e.g., 110, 112 and 114). DES 108 may receive the logistics plant data to synchronize (e.g., LP data to sync 230) with a mirrored material master view (e.g., LP mirrored MM view 232) for the logistics plant material master view (e.g., 218 and 220) in the virtual manufacturing network through the virtual hub interface 212.

The memory 208 may further comprise a data conversion specifier 234 that directs DEM 226 to implement a specified data conversion during the mirroring operation 228. DEM 226 may further comprise process order creation logic 236 that receives a process order request 238 through the logistics plant synchronization interface 210 from the originating logistics plant (e.g., 110, 112 and 114) in order to initiate execution of a production activity 240. The process order creation logic 236 communicates the process order request 238 to the virtual manufacturing network (e.g., the various components of the VMN system architecture 102). DEM 226 further comprises process order release request logic 242 that receives a process order release status 244 from the virtual manufacturing network and communicates the process order release status 244 to the originating logistics plant (e.g., 110, 112 and 114). DEM 226 also includes additional material transfer logic 246 that receives an additional material request 248 from the virtual manufacturing network and communicates the additional material request 248 to a selected logistics plant from among the multiple logistics plants (e.g., 110, 112 and 114). DEM 226 includes dynamic bins logic 250 that receives materials movement information 252 from the originating logistics plant and communicates the materials movement information 252 to the virtual manufacturing network. DEM 226 includes material return logic 254 that receives material-to-return-to-warehouse information 256 from the virtual manufacturing network and communicates the material-to-return-to-warehouse information 256 to a selected logistics plant from among the multiple logistics plants (e.g., 110, 112 and 114). DEM 226 comprises material consumption transfer logic 258 that receives materials consumption information 260 from the virtual manufacturing network and communicates the materials consumption information to a selected logistics plant from among the multiple logistics plants (e.g., 110, 112 and 114). DEM 226 comprises stock transfer logic 262 that receives final goods receipt information 264 from the virtual manufacturing network and communicates the final goods receipt information to the selected logistics plant (e.g., 110, 112 and 114). DEM 226 comprises operation confirmation data transfer logic 266 that receives an operation confirmation process order closure status 268 from the virtual manufacturing network and communicates the operation confirmation process order closure status 268 to a selected logistics plant from among the multiple logistics plants (e.g., 110, 112 and 114). MCHub 104 may include a MCHub repository 270 where various data, such as material master view definitions 214, mirrored data and detailed recipes for the logistic plants (e.g., 110, 112 and 114) and other components of the virtual manufacturing system architecture 102 are stored.

Figure 3:
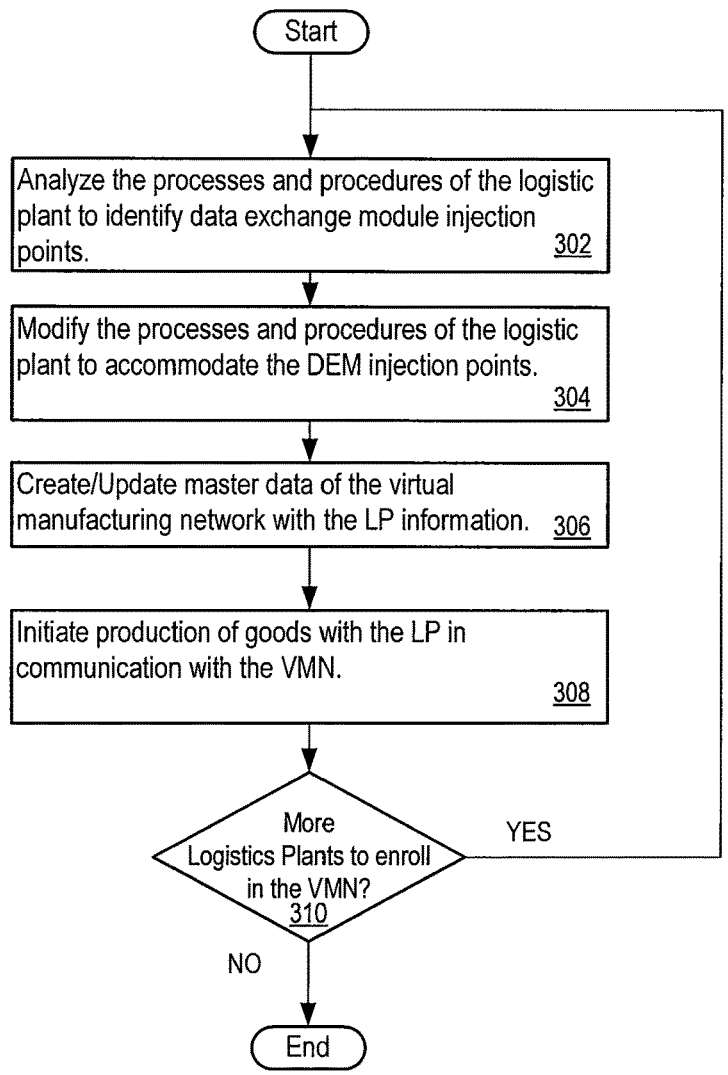
FIG. 3 shows the logic flow that a data exchange module (DEM) may take to implement a virtual manufacturing network for multiple logistic plants.

FIG. 3 shows the logic flow that a data exchange module may take to implement a virtual manufacturing network for multiple logistic plants. In one implementation, the DEM 226 includes logic to analyze the following processes and procedures of a logistic plant to identify DEM injection points (302): 1) process order creation and process order release; 2) staging materials to production; 3) goods movement management through the logistics plant; 4) confirmation of operations and process order closures; 5) batch status management; 6) material master creation and material master modifications; 7) recipe creation and recipe modification; and 8) bill of material creation and bill of material modifications. Other injection points may be identified. The DEM injection points represent locations within the processes and procedures of the logistic plant where DEM logic may be incorporated to communicate with the DEM 226, the ePES 106, and other components of the virtual manufacturing network. DEM 226 modifies the processes and procedures of the logistic plant at the DEM injection points so that the logistic plant may communicate data messages related to the processes identified above with ePES 106 through the DEM 226 (304). DEM 226 creates/updates master data of the virtual manufacturing network with information of the logistic plant (306), and the production of FG/HFG is initiated with the logistic plant in communication with the virtual manufacturing network (308).

In other implementations, the injections points may be manually identified and communication hooks may be injected in the LPs to facilitate the communication of data messages through the DEM 226. For example, the communications logic and messaging functionality of the process order creation and process order release processes and procedures of the LPs may be analyzed to identify the inputs and outputs for those processes and procedures. The communication logic and message functionality of the LPs may be modified to implement the communication hooks of the DEM 226 so that the inputs of the LPs are received from the process order creation logic 236 and the outputs of the LPs are communicated to the process order creation logic 236. Similarly, the communications logic and messaging functionality of various processes and procedures of the LPs may be modified to implement the communication hooks of DEM 226 to integrate the LPs with the virtual manufacturing system. For example, the communication hooks may include instructions that direct the communications logic and messaging functionality of the LPs to send mirrored messages to the DEM 226 and receive messages from DEM 226. The mirrored messages sent to the DEM 226 allow the production system to maintain data alignment with the LPs. The instructions of the communications hooks direct the communications logic and messaging functionality of the LPs to accept and process the messages received from the DEM 226 so that the production system may impose control over the LPs. For example, the DEM 226 may send batch status messages, batch disposition messages and usage decision messages to the LPs, and the LPs may in turn initiate operations in the LPs responsive to those messages. In this regard, the DEM 226 acts as an interface layer between the disbursed LPs and the production system to create a VMN that includes data mirroring capability. The data mirroring capability helps the VMN execute centralized control and monitoring of the LPs, so that the production for these LPs may be guided along a previously approved central standard. When the communications hooks are implemented, the LPs merge into a VMN that centrally manages the LPs. The DEM 226 acts as the intermediary between the LPs and the production system to facilitate the centralized control, by message passing and processing through the DEM 226, which takes the appropriate data mirroring actions for a wide range of functionality, as shown in FIGS. 4-13.

Figure 4:
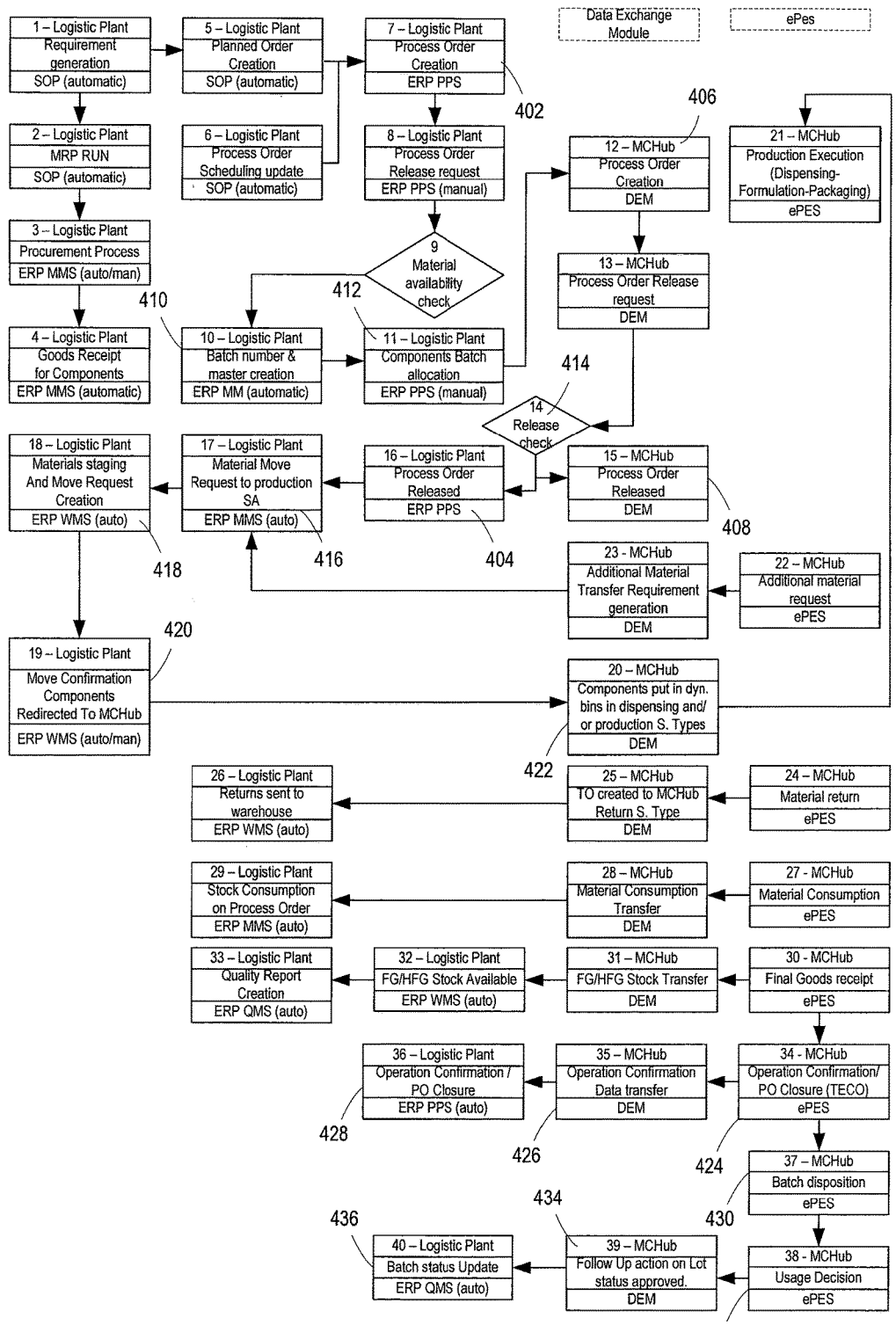
FIG. 4 shows the logic flow that a virtual manufacturing network may take to create a process order and complete a process order.

FIG. 4 shows the logic flow that a virtual manufacturing network (e.g., MCHub 104) may take to create a process order and complete a process order. In one implementation, master data of a logistic plant (e.g., 110, 112 and 114) is copied into MCHub 104. For example, master data may include material master basic data, recipe structure and lists of components with quantities. MCHub 104 performs the maintenance of ePES 106 data (e.g., the material master view and full detailed recipe). MCHub 104 includes mirroring logic that copies the common master data from the logistic plant into MCHub 104.

When a process order is created (402) and released (404) on a logistic plant, DEM 226 creates a process order (406) and releases the process order (408) on MCHub 104 and copies the data related to the HFG/FG batch ID (e.g., 410, 412). The release of the order in MCHub 104 may occur when the checks (414) on ePES 106 master data are successful. Status information from MCHub 104 is communicated to the ERP system of the LP, in order to keep the statuses of the two corresponding process orders aligned in case of release failure in the production plant. When the process order is released in the logistic plant, the material staging can be performed in the production supply areas (416, 418) defined in the ERP system. The materials for production are blocked in relation to warehouse management, but are viewable as inventory at quantity level and value level in the LP. A material entry is performed in MCHub 104 and the materials are managed at quantity level. The material movements (420) in the logistic plant (e.g., material returns and HFG/FG goods receipts) are managed by registering the movement (422) in MCHub 104 and posting the corresponding movement on the LP and/or releasing the warehouse management block on LP. Operations confirmation and process order closure (424) in MCHub 104 are immediately transferred (426, 428) in the corresponding process order on the logistic plant, in order to allow a punctual planning and costing calculation in the ERP system. The batch disposition (430) and the checklist evaluation processes are performed in MCHub 104 using the ePES 106 functionalities. The usage decision (UD) (432) is communicated to the LP via a follow up action (434) which aligns the UD code and changes the stock (batch) status (436). The batch record updating, the batch disposition (436) and the usage decision (432) are also performed on MCHub 104 and the usage decision is communicated to the LP.

Table 1 lists process descriptions for the logic flow shown in FIG. 4.

TABLE 1

Virtual Manufacturing Network Process Descriptions

| No. | Process Flow Logic | Plant | Detail Process Flows components | Reference ID. (FIGS. 4 thru 13) |
|---|---|---|---|---|
| 1 | Requirement generation | Logistic Plant | | |
| 2 | MRP RUN | Logistic Plant | | |
| 3 | Procurement Process | Logistic Plant | | |
| 4 | Goods Receipt for Components | Logistic Plant | | |
| 5 | Planned Order Creation | Logistic Plant | | |
| 6 | Process Order Scheduling update | Logistic Plant | | |
| 7 | Process Order Creation | Logistic Plant | Process Order Creation | POM 1.1 |
| 8 | Process Order Release Request | Logistic Plant | Process Order Release Request | POM 1.3 |
| 9 | Material availability check | Logistic Plant | Material availability check | POM 1.4 |
|   |   |   | Missed Release workflow message | POM 1.15 B |
| 10 | Batch number & master creation | Logistic Plant | Batch number creation | POM 1.5 |
|   |   |   | Batch master creation | POM 1.6 |
| 11 | Components Batch allocation | Logistic Plant | Components Batch allocation | POM 1.2 |
| 12 | Process Order Creation | MCHub | Process Order Data transfer To MCHub | POM 1.7 |
|   |   |   | Process Order Creation (Copy) | POM 1.8 |
| 13 | Process Order Release request | MCHub | PO number correspondence update | POM 1.9 |
|   |   |   | Process Order Start Release | POM 1.10 |
| 14 | Release Check | MCHub | Master data status Check | POM 1.11 |
|   |   |   | Master data Validity Check | POM 1.12 |
|   |   |   | Other the virtual manufacturing network Master data Checks | POM 1.13 |
|   |   |   | Release Check | POM 1.14 |
|   |   |   | Components Batch allocation Copy | POM 1.15 |
|   |   |   | Batch number creation (Mirror) | POM 1.16 |
|   |   |   | Batch master creation (Mirror) | POM 1.17 |
|   |   |   | Inspection Lot creation (type 4) | POM 1.18 |
|   |   |   | Missed Release workflow message | POM 1.15 B |
| 15 | Process Order Released | MCHub | Process Order Released | POM 1.19 |
|   |   |   | Process Order Data transfer From MCHub | POM 1.20 |
|   |   |   | Process Order Release | MSP 2.1 |
|   |   |   | Dynamic Bin Creation (PO related) in dispensing and/or production SA | MSP 2.2 |
| 16 | Process Order Released | Logistic Plant | Process Order Released | POM 1.21 |
|   |   |   | Process Order Released | MSP 2.3 |
| 17 | Transfer Requirement for components to production SA | Logistic Plant | Transfer Requirement for components to production SA | MSP 2.4 |
| 18 | Materials staging and TO Creation | Logistic Plant | Materials staging | MSP 2.5 |
|   |   |   | TO Creation | MSP 2.6 |
| 19 | TO Confirmation Components Redirected to MCHub 104 | Logistic Plant | TO Confirmation to Dispensing/Production Logistic Plant production SA | MSP 2.7 |

TABLE 1-continued

Virtual Manufacturing Network Process Descriptions

| No. | Process Flow Logic | Plant | Detail Process Flows components | Reference ID. (FIGS. 4 thru 13) |
|---|---|---|---|---|
| 20 | Components put in dyn. bins in dispensing and/or production S.Types | MCHub | MM Goods receipt for components | MSP 2.8 |
| | | | Blocking WM status for components | MSP 2.9 |
| | | | Batch master Copy for components | MSP 2.10 |
| | | | Staging Destination Redirect to dedicated SA | MSP 2.11 |
| | | | Stock available in Dispensing/Production MCHub 104 SA | MSP 2.12 |
| 21 | Production Execution (Dispensing-formulation-Packaging) | | Please refer to paragraph MCHub 104 ePES Core Functionalities | the virtual manufacturing network core |
| 22 | Additional material request | MCHub | Additional material request | MSP 2.13 |
| 23 | Additional Material Transfer Requirement generation | MCHub | Additional Material Transfer Requirement generation | MSP 2.14 |
| 24 | Material return | MCHub | Material return | GMM 3.1 |
| 25 | TO created to MCHub 104 Return S.Type | MCHub | TO created to MCHub 104 Return SA | GMM 3.2 |
| | | | Unblocking return for material/batch/q.ty | GMM 3.3 |
| 26 | Returns sent to warehouse | Logistic Plant | TO Created on Logistic Plant to return Area | GMM 3.4 |
| | | | Sock available Return SA in the LP | GMM 3.5 |
| 27 | Material Consumption | MCHub | Material consumption | GMM 3.6 |
| | | | Consumption of MCHub 104 stock On a Process Order | GMM 3.7 |
| 28 | Material Consumption Transfer | MCHub | Material consumption transfer | GMM 3.8 |
| 29 | Stock Consumption on Process Order | Logistic Plant | Consumption of LP Stock On a Process Order | GMM 3.9 |
| 30 | Final Goods receipt | MCHub | Final Goods Receipt | GMM 3.10 |
| | | | Goods receipt | BSM 5.1 |
| | | | Inspection lot Creation | BSM 5.3 |
| 31 | FG/HFG Stock Transfer | MCHub | FG/HFG Goods Receipt | GMM 3.11 |
| | | | FG/HGF stored in Goods Receipt SA | GMM 3.12 |
| | | | Stock Transfer | GMM 3.13 |
| 32 | FG/HFG Stock Available | Logistic Plant | Stock available in Goods Receipt Area | GMM 3.14 |
| 33 | Inspection Lot creation | Logistic Plant | Inspection Lot creation | GMM 3.15 |
| | | | Inspection Lot creation | BSM 5.2 |
| 34 | Operation Confirmation/PO Closure (TECO) | MCHub | Closure Request | OCC 4.1 |
| | | | Resource timing data input | OCC 4.2 |
| | | | Close Operation | OCC 4.3 |
| | | | Last Operation | OCC 4.4 |
| | | | PO Closure (TECO) | OCC 4.7 |
| 35 | Operation Confirmation Data transfer | MCHub | Operation Confirmation and Resource usage Data transfer | OCC 4.5 |
| | | | Operation Confirmation and Resource usage Data transfer | OCC 4.8 |
| 36 | Operation Confirmation/PO Closure (TECO) | Logistic Plant | Close Operation | OCC 4.6 |
| | | | Close Last Operation | OCC 4.9 |
| | | | PO Closure (TECO) | OCC 4.10 |
| | | | Operation Cost Accounting | OCC 4.11 |
| 37 | Batch disposition | MCHub | Batch selection Through Inspection lot. code | BSM 5.4 |
| | | | Batch record Archiving | BSM 5.5 |
| | | | Checklist Evaluation | BSM 5.6 |
| 38 | Usage Decision | McHub | Usage decision recording on Inspection Lot | BSM 5.7 |
| | | | Final Usage decision | BSM 5.11 |
| | | | Inspection Lot Closure | BSM 5.12 |
| 39 | Follow Up action on Lot status approved | MCHub | Follow Up Action Usage decision Transfer | BSM 5.8 |

TABLE 1-continued

Virtual Manufacturing Network Process Descriptions

| No. | Process Flow Logic | Plant | Detail Process Flows components | Reference ID. (FIGS. 4 thru 13) |
|---|---|---|---|---|
| 40 | Lot status Update | Logistic Plant | Usage decision Recording on Inspection Lot | BSM 5.9 |
| | | | MM stock status Alignment | BSM 5.10 |

Figure 5:
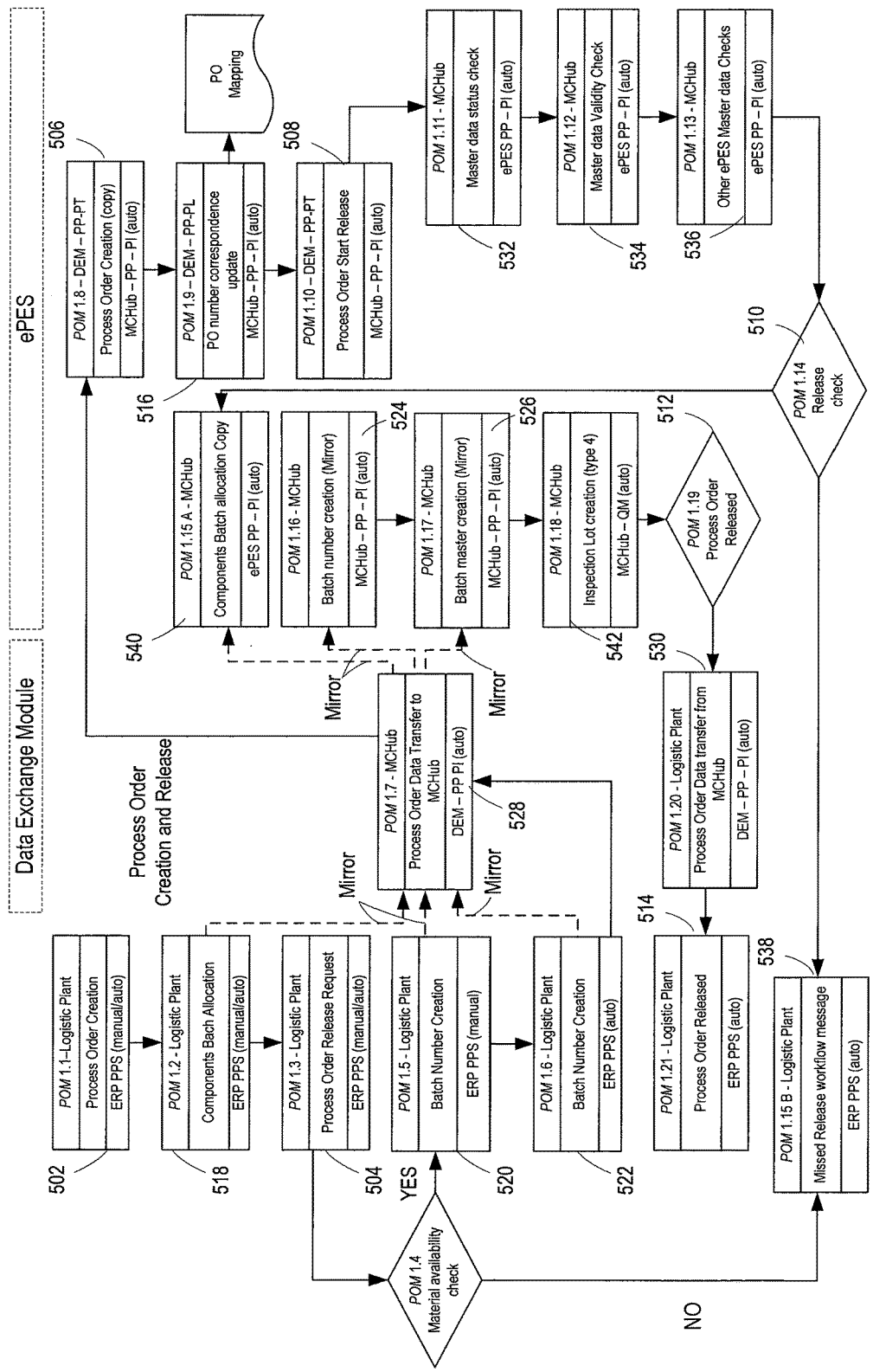
FIG. 5 shows the logic flow that a virtual manufacturing network may take to create a process order and release a process order.

FIG. 5 shows the logic flow that a virtual manufacturing network may take to create a process order and release a process order. A process order is created and released in order to initiate production activities 240. The logistic plant performs the process order creation (502) and process order release (504). However, in order to activate ePES 106 on MCHub 104, a corresponding process order (506) is also created and released (508) on MCHub 104.

MCHub 104 provides process order management, where process orders are created on the LP to ensure a consistent process order to cost accounting for the production process and allow planning to be aware of the process order. A corresponding process order is created on MCHub 104 to enable production execution with ePES 106. When a process order is released on the LP, DEM 226 creates and releases a corresponding process order on MCHub 104. In the event the process order creation and release on MCHub 104 is unsuccessful (510, 512), a warning message may be communicated by MCHub 104 to the LP (e.g., 110, 112 and 114) through the logistics plant synchronization interface 210, in order to maintain the status of the process order in MCHub 104 and the LP (e.g., 110, 112 and 114).

In one implementation, MCHub 104 does not impact the process order creation in the ERP system of the selected LP, so that rescheduling non-released process orders may be possible on the LP without effecting corresponding process orders on MCHub 104. DEM 226 may communicate with a process order release procedure (514) of the ERP system of the LP (e.g., 110, 112 and 114). MCHub 104 may assign a number ID (e.g., process order number) (516) to the PO created in MCHub 104 and the format of the number ID may follow formatting rules of the LP (e.g., 110, 112 and 114).

Process order creation may be initiated in the ERP system of LP (e.g., 110, 112 and 114). For example, the user of the LP may perform a manual batch allocation (518) for the components for the process order release process (e.g. half-finished goods for packaging orders). In one implementation, the manual batch allocation is not affected, unless the process order has been communicated to MCHub 104. The process order release request (504) may be processed by the LP and once the process order is released, a batch numbering (520) may be assigned to the half-finished goods and finished goods (HFG/FG) to be produced. A batch master (522) of the ERP system may be generated for the goods to be produced. The batch number and batch master may be copied (524, 526) to MCHub 104 to maintain the batch consistency between multiple logistic plants (e.g., 110, 112 and 114).

A release procedure of the LP may communicate with the DEM 226 so that a process order data transfer (528, 530) to MCHub 104 is activated by DEM 226. Linking the release procedures of the multiple logistic plants (e.g., 110, 112 and 114) to DEM 226 aligns process order releases between logistic plants and ePES 106, so that a process order released on a LP occurs when a corresponding process order is successfully released on MCHub 104. The process order data transfer (528, 530) may be invoked by a "user exit" process of the process order release procedure of the LP (e.g., 110, 112 and 114).

The process order data transfer (528, 530) enables process order creation to occur for the corresponding material master in MCHub 104. Process orders created in MCHub 104 may be automatically released by the process order management flow of MCHub 104. In one implementation, the process order release on MCHub 104 involves several checks of ePES 106 master data, including the master data status check (532) (e.g., "approved" and "not approved") and the master data validity check (534) (e.g., the coherence of ePES 106 master data). Additional, fewer and/or different ePES 106 master data checks (536) may be performed before a process order is released. When a process order is released in MCHub 104, a process order release confirmation message is communicated to the LP (e.g., 110, 112 and 114) and in the event a process order is not released by MCHub 104 a missed release status message (538) is communicated to the LP.

The process order data transfer (528, 530) of the DEM 226 communicates a batch allocation from the LP (e.g., 110, 112 and 114) to batch allocation copy (540) logic of ePES 106. The process order data transfer (528, 530) also communicates the batch number (520) and the batch master (522) from the LP (e.g., 110, 112 and 114) to ePES 106. Correspondingly, ePES 106 creates the batch number (524) and batch master (526) to preserve the integrity of the LP (e.g., 110, 112 and 114) data that is mirrored by MCHub 104. An inspection lot (542) is created for the batch number and batch master of finished goods and/or half finished goods. In one implementation, the inspection lot (542) is created specifically for MCHub 104.

Table 2 lists process descriptions for the process order creation and process order release logic flow shown in FIG. 5.

TABLE 2

Process Descriptions

| ID | Process Order Creation and Release | System |
|---|---|---|
| POM 1.1 | Process Order Creation | ERP PPS (manual/auto) |
| POM 1.2 | Components Batch allocation | ERP PPS (manual/auto) |
| POM 1.3 | Process Order Release Request | ERP PPS (manual) |
| POM 1.4 | Material availability check | ERP |
| POM 1.5 | Batch number creation | ERP PPS (auto) |
| POM 1.6 | Batch master creation | ERP PPS (auto) |
| POM 1.7 | Process Order Data transfer To MCHub | DEM - MM (auto) |
| POM 1.8 | Process Order Creation (Copy) | MCHub 104 PP - PI (auto) |

TABLE 2-continued

Process Descriptions

| ID | Process Order Creation and Release | System |
|---|---|---|
| POM 1.9 | PO number correspondence update | MCHub 104 PP - PI (auto) |
| POM 1.10 | Process Order Start Release | MCHub 104 PP - PI (auto) |
| POM 1.11 | Master data status Check | the virtual manufacturing network PP - PI (auto) |
| POM 1.12 | Master data Validity Check | the virtual manufacturing network PP - PI (auto) |
| POM 1.13 | Other the virtual manufacturing network Master data Checks | the virtual manufacturing network PP - PI (auto) |
| POM 1.14 | Release Check | the virtual manufacturing network |
| POM 1.15 A | Components Batch allocation Copy | the virtual manufacturing network PP - PI (auto) |
| POM 1.15 B | Missed Release workflow message | ERP PPS (auto) |
| POM 1.16 | Batch number creation (Mirror) | MCHub 104 - PP-PI (auto) |
| POM 1.17 | Batch master creation (Mirror) | MCHub 104 - PP-PI (auto) |
| POM 1.18 | Inspection Lot creation (type 4) | MCHub 104 - QM (auto) |
| POM 1.19 | Process Order Released | the virtual manufacturing network |
| POM 1.20 | Process Order Data transfer From MCHub | DEM - PP - PI (auto) |
| POM 1.21 | Process Order Released | ERP PPS (auto) |

Figure 6:
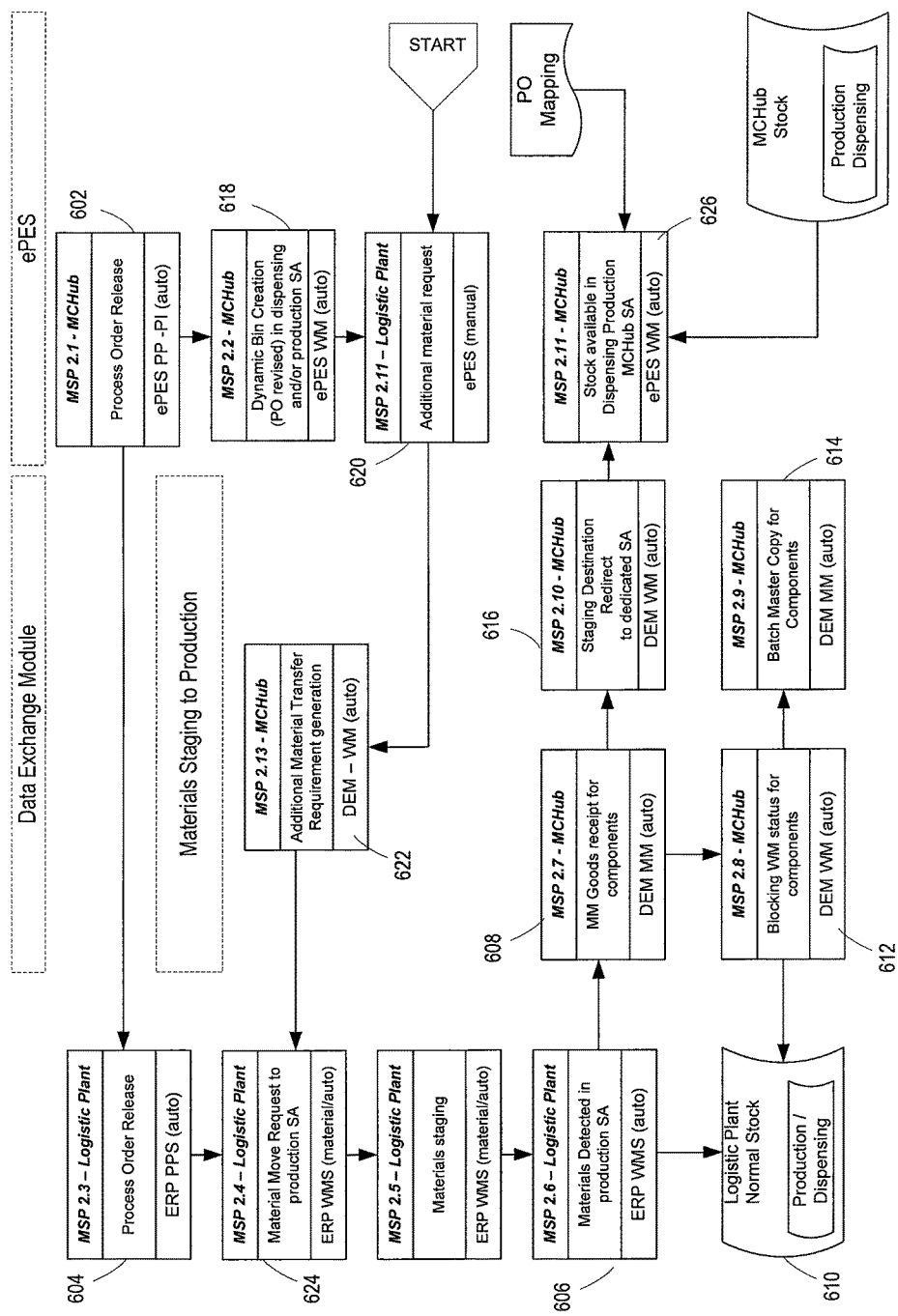
FIG. 6 shows the logic flow that a virtual manufacturing network may take to stage material in production.

FIG. 6 shows the logic flow that a virtual manufacturing network (e.g., MCHub 104) may take to stage material in production. In order to initiate production of a process order, material staging may be carried out for the materials used to complete the process order. Components that may be used to complete a process order in production may be placed under the control of MCHub 104. Logistic plants (e.g., 110, 112 and 114) maintain responsibility for their respective material accounting and planning processes. Material staging to production may be driven by the following, regarding both raw materials and finished/half finished materials: 1) materials are transferred from a LP (e.g., 110, 112 and 114) to MCHub 104 when a process order is released (602, 604) and the appropriate quantities are delivered to the production staging area (SA) (606), and the materials are transferred (608) from LP (e.g., 110, 112 and 114) to MCHub 104 along with control of those materials and the allocated batches and quantities; and 2) the location of the transferred materials is maintained in the LP stock (610) and the transferred materials are blocked (612) so that the location of the transferred materials cannot be changed in the LP. The transfer of the materials to MCHub 104 does not affect the financial and planning process of the LP (e.g., 110, 112 and 114), because the materials are maintained in the LP stock (610) (inventory list).

When the process order is released (602) on MCHub 104, dynamic bin creation logic (618) creates dynamic bins (e.g., storage bins) according to MCHub 104 storage types. In one implementation, the dynamic bin creation logic (618) is automatically invoked when the process order is released on MCHub 104. A dynamic storage bin is created at process order release and deleted at process order closure. A dynamic storage bin is created in the dispensing storage type for formulation process orders and in production storage type for packaging process orders. Two dynamic storage bins may be created for formulation process orders that use materials to be dispensed in production, so that a first dynamic storage bin is used in dispensing and a second dynamic storage bin is used in formulation.

The materials of the released process order are transferred to a production area as defined on LP and according to the list of allocated batches on the process order with no relevant modification of LP staging process.

When the materials are delivered to the production area the blocking warehouse status (WS) for components logic (612) may prevent changes to the warehouse location, the material/batch and quantity in the LP. The material/batch may be independently communicated in MCHub 104 through a material stock entry (e.g., goods receipt). The stock entry may cause the transfer of the received materials into the dynamic storage bin for the process order, placed in the production and/or dispensing storage types.

In order to ensure the consistency of batch master information between the logistic plants and MCHub 104, the batch master of the received material may be copied (614) from the logistic plants into MCHub 104. Consistency of batch master information between the logistic plants and MCHub 104 ensures consistency across multiple production plants, including data relevant for batch status, such as the expiration date, batch status and the data contained in the batch classification.

Staging that is not automatically performed at process order release may be performed manually on the LP (e.g., shop floor materials for which a replenishment is not executed at the process order level). When materials are delivered to the production area, DEM 226 may automatically communicate the staged materials (616) to MCHub 104.

A user of ePES 106 may invoke additional material request logic (620) (e.g. from the production cockpit). The additional material request logic (620) may create an additional material transfer requirement (622) may be communicated by DEM 226 to the LP. The additional material request may cause a material move request in production (624). The additional requested stock may be transferred to MCHub 104 and blocked (612) to prevent warehouse movements in the LP. The components may be directed into production and/or dispensing storage areas (626) according to a control cycle (e.g., standard SAP™ control cycle) defined by MCHub 104.

Table 3 lists process descriptions for the material staging to production logic flow shown in FIG. 6.

TABLE 3

Process Descriptions

| ID | | System |
|---|---|---|
| | Materials Staging to production Material request | |
| MSP 2.1 | Process Order Release | the virtual manufacturing network PP-PI (auto) |
| MSP 2.2 | Dynamic Bin Creation (PO related) in dispensing and/or production SA | the virtual manufacturing network WM (auto) |
| MSP 2.3 | Process Order Release | ERP PPS (auto) |
| MSP 2.4 | Material Move Request to production SA | ERP WMS (auto) |
| MSP 2.5 | Materials staging | ERP WMS (manual/auto) |
| MSP 2.6 | Material Delivered in production SA | ERP WMS (auto) |
| MSP 2.7 | MM Goods receipt for components | DEM - MM (auto) |
| MSP 2.8 | Blocking WM status for components | DEM - WM (auto) |
| MSP 2.9 | Batch Master Copy for Components | DEM - WM (auto) |

TABLE 3-continued

Process Descriptions

| ID | | System |
|---|---|---|
| MSP 2.10 | Staging Destination Redirect to dedicated SA | DEM - WM (auto) |
| MSP 2.11 | Stock available in Dispensing/Production MCHub 104 SA | the virtual manufacturing network WM (auto) |
| | Materials Staging to production Additional material request | |
| MSP 2.12 | Additional material request | the virtual manufacturing network (manual) |
| MSP 2.13 | Additional Material Transfer Requirement generation | DEM - WM (auto) |

Figure 7:
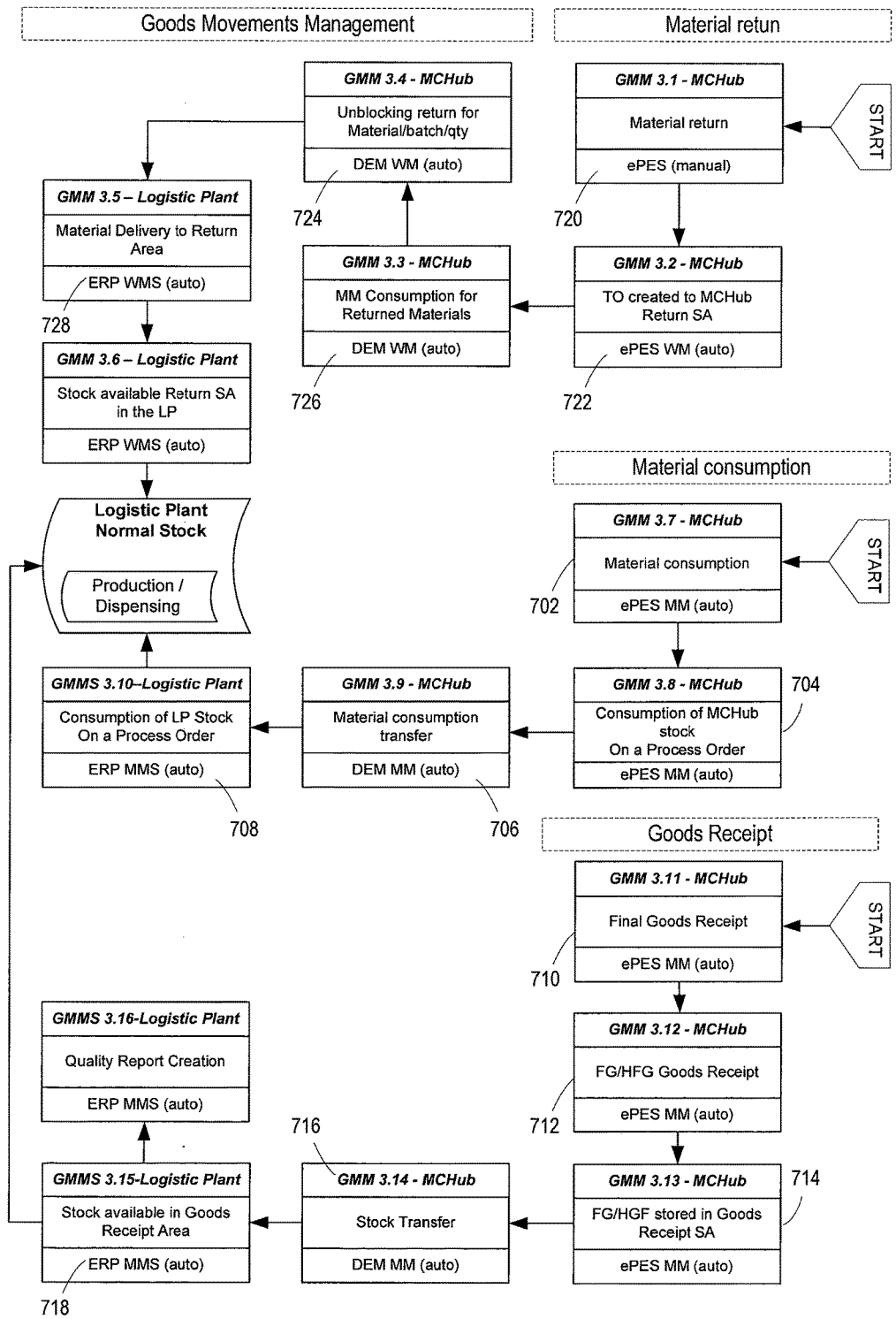
FIG. 7 shows the logic flow that a virtual manufacturing network may take to manage the movement of goods.

FIG. 7 shows the logic flow that a virtual manufacturing network may take to manage the movement of goods. During the execution of production activities 240 on MCHub 104, the material consumption of batch components (702, 704) may be automatically invoked by ePES 106 when the materials are received and/or usage declaration occurs in ePES 106. A process order consumption document may be created for the quantity and the goods consumed in the production supply area defined by the control cycle for each component. DEM 226 communicates the information about the material consumption (706) and a follow up action requested to the LP. The material/batch/quantity consumed is communicated by DEM 226 to the consumption of LP stock on a process order (708).

When production activities 240 are completed, ePES 106 goods receipt logic (710, 712, 714, and 716) communicates the quantity of produced goods and a posting document is created for the produced quantity in MCHub 104. DEM 226 receives the information about the goods receipt and FG/HFG roods receipt from ePES 106 and communicates information to the stock available in goods receipt area (718) of the LP, including the following information: 1) goods issued of produced FG/HFG; and 2) goods receipt for the material/batch/quantity/stock status in the ERP system of the LP for the corresponding process order. The FG/HFG produced may be moved under the control of the LP and managed according to procedures for the FG/HFG warehousing. Unconsumed material may be communicated (720 and 722) by ePES 106 to DEM 226 and DEM 226 may unblock the material/batch/quantity returned to the control of LP and communicate material movement of the returned material/batch/quantity (720 and 722) to the material return area (724) of the LP.

Table 4 lists process descriptions for the goods movement management logic flow shown in FIG. 7.

TABLE 4

Process Descriptions

| ID | Goods Movement Management | System |
|---|---|---|
| | Material Return | |
| GMM 3.1 | Material return | the virtual manufacturing network (manual) |
| GMM 3.2 | TO created to MCHub 104 Return SA | the virtual manufacturing network - WM (auto) |
| GMM 3.3 | MM Consumption for Returned Materials | DEM - WM (auto) |

TABLE 4-continued

Process Descriptions

| ID | Goods Movement Management | System |
|---|---|---|
| GMM 3.4 | Unblocking return for material/batch/q.ty | DEM - WM (auto) |
| GMM 3.5 | Material Delivery to Return Area | ERP WMS (auto) |
| GMM 3.6 | Sock available Return SA in the LP Material Consumption | ERP MMS (auto) |
| GMM 3.7 | Material consumption | the virtual manufacturing network (manual) |
| GMM 3.8 | Consumption of MCHub 104 stock On a Process Order | the virtual manufacturing network - MM (auto) |
| GMM 3.9 | Material consumption transfer | DEM MM (auto) |
| GMM 3.10 | Consumption of LP Stock On a Process Order Goods Receipt | ERP MMS (auto) |
| GMM 3.11 | Final Goods Receipt | the virtual manufacturing network (manual) |
| GMM 3.12 | FG/HFG Goods Receipt | the virtual manufacturing network - MM (auto) |
| GMM 3.13 | FG/HGF stored in Goods Receipt SA | the virtual manufacturing network - WM (auto) |
| GMM 3.14 | Stock Transfer | DEM - MM (auto) |
| GMM 3.15 | Stock available in Goods Receipt Area | ERP MMS-WMS (auto) |
| GMM 3.16 | Quality Report Creation | ERP MMS (auto) |

Figure 8:
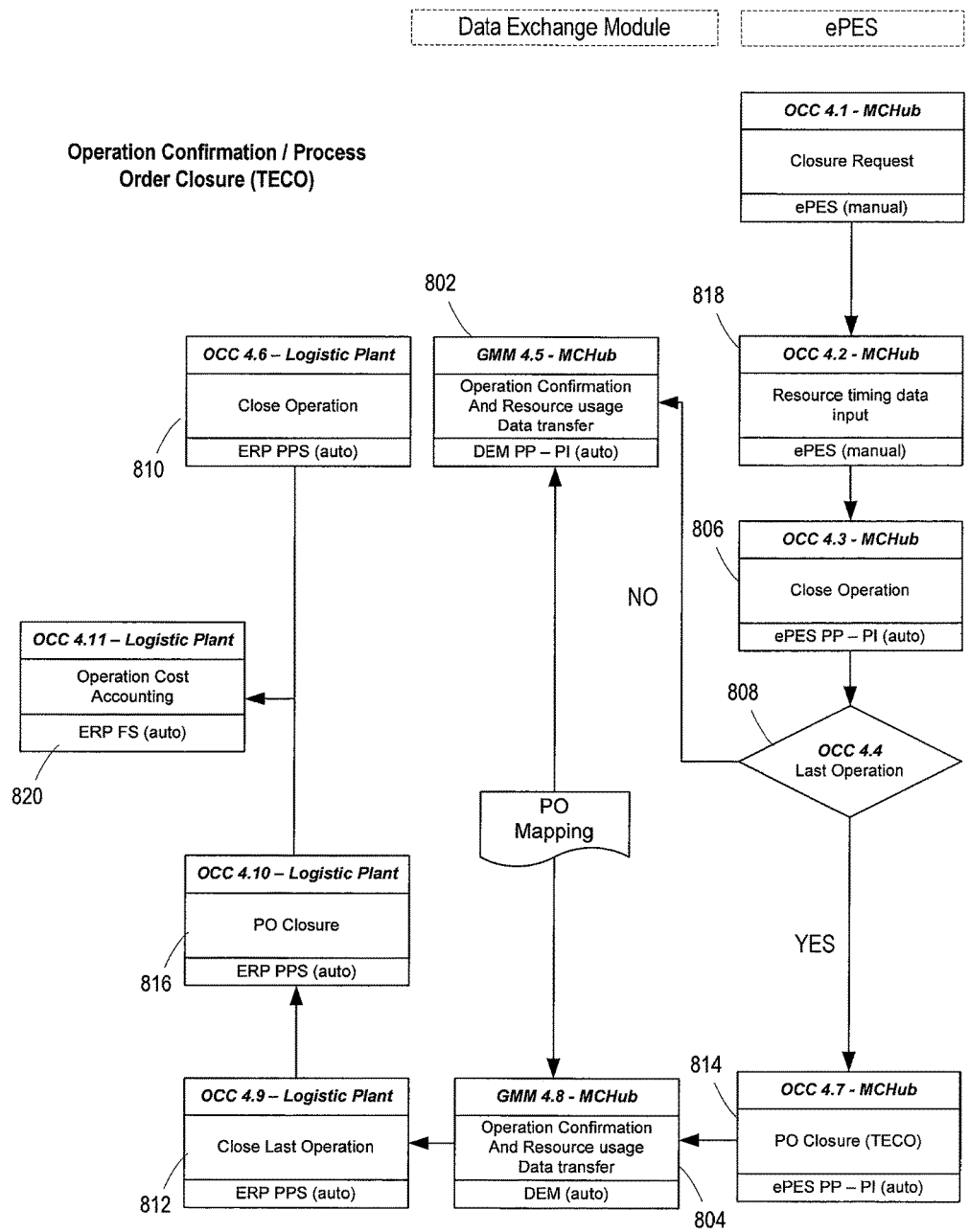
FIG. 8 shows the logic flow that a virtual manufacturing network may take to confirm an operation and the closure of a process order.

FIG. 8 shows the logic flow that a virtual manufacturing network may take to confirm an operation and the closure of a process order. To ensure that production activities 240 are aligned between the LP and MCHub 104, the operation confirmation and process order closure logic (802, 804) communicates the closure of an operation and/or the whole process order. MCHub 104 and the LP track the closure of an operation (806, 808, 810, and 812) and/or closure of a process order (814, 816), in order to facilitate financial accounting and planning on LP.

MCHub 104 communicates resource usage information (e.g., time consumed by the workforce and/or machinery resource) to the LP. Operation confirmation and resource usage data transfer logic collects the resource utilization data (e.g., time consumed to complete a process order). Resource utilization data (818) may be communicated by the operation confirmation and resource usage data transfer logic (802, 804) to the LP. The LP and MCHub 104 maintain copies of the resources used to complete the production execution of a process order, so that planning and cost accounting analysis (820) may be performed.

The closure checks logic (814) of ePES 106 provides a user the ability to check the completeness and correctness of a completed process instructions sheet (PI-Sheet) and the user can invoke a "resource timing data input" form (818) to enter correct resource utilization data and/or input the values from an external system (e.g., PRS (Production Reporting System) external legacy system).

The data entered on the "resource timing data input" form (818) is stored and the user may confirm the closure with the close operation logic (806). The close operation logic (806) uses ePES 106 functionality to perform the operation confirmation, the control recipe closure and the inspection lot update. The operation confirmation and resource usage data transfer logic (802, 804) communicates the closure status and cost accounting data to the LP.

Table 5 lists process descriptions for the operation confirmation and process order closure logic flow shown in FIG. 8.

TABLE 5

Process Descriptions

| ID | Operation Confirmation/PO Closure (TECO) | System |
|---|---|---|
| OCC 4.1 | Closure Request | the virtual manufacturing network (manual) |
| OCC 4.2 | Resource timing data input | the virtual manufacturing network (manual) |
| OCC 4.3 | Close Operation | the virtual manufacturing network - PP - PI (manual) |
| OCC 4.4 | Last Operation check | the virtual manufacturing network (auto) |
| OCC 4.5 | Operation Confirmation and Resource usage Data transfer | DEM - PP-PI (auto) |
| OCC 4.6 | Close Operation | ERP PPS (auto) |
| OCC 4.7 | PO Closure (TECO) | the virtual manufacturing network - PP - PI (manual) |
| OCC 4.8 | Operation Confirmation and Resource usage Data transfer | DEM - PP - PI (auto) |
| OCC 4.9 | Close Last Operation | ERP PPS (auto) |
| OCC 4.10 | PO Closure | ERP PPS (auto) |
| OCC 4.11 | Operation Cost Accounting | ERP FS (auto) |

Figure 9:
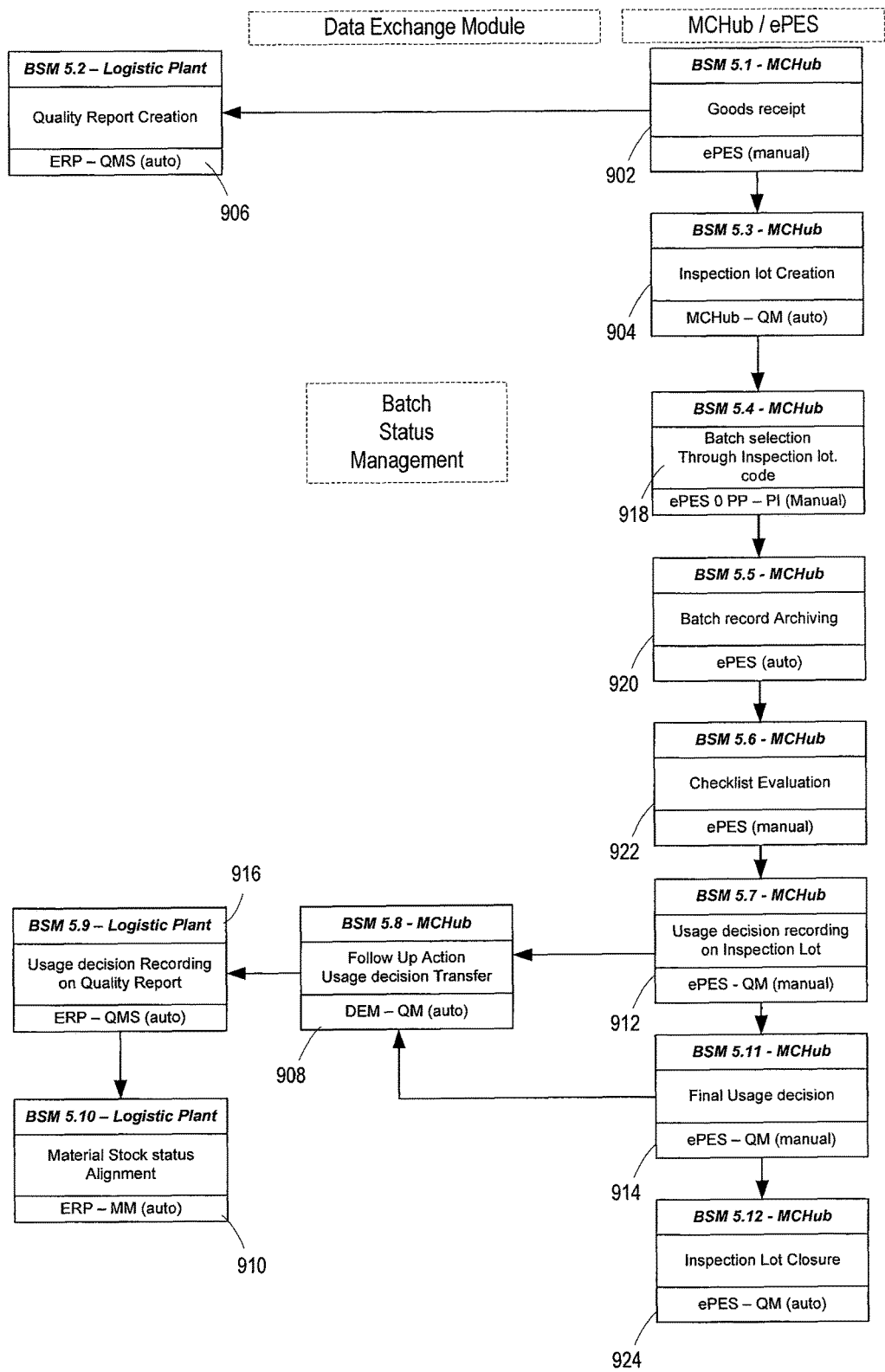
FIG. 9 shows the logic flow that a virtual manufacturing network may take to manage the status of a batch.
Figure 10:
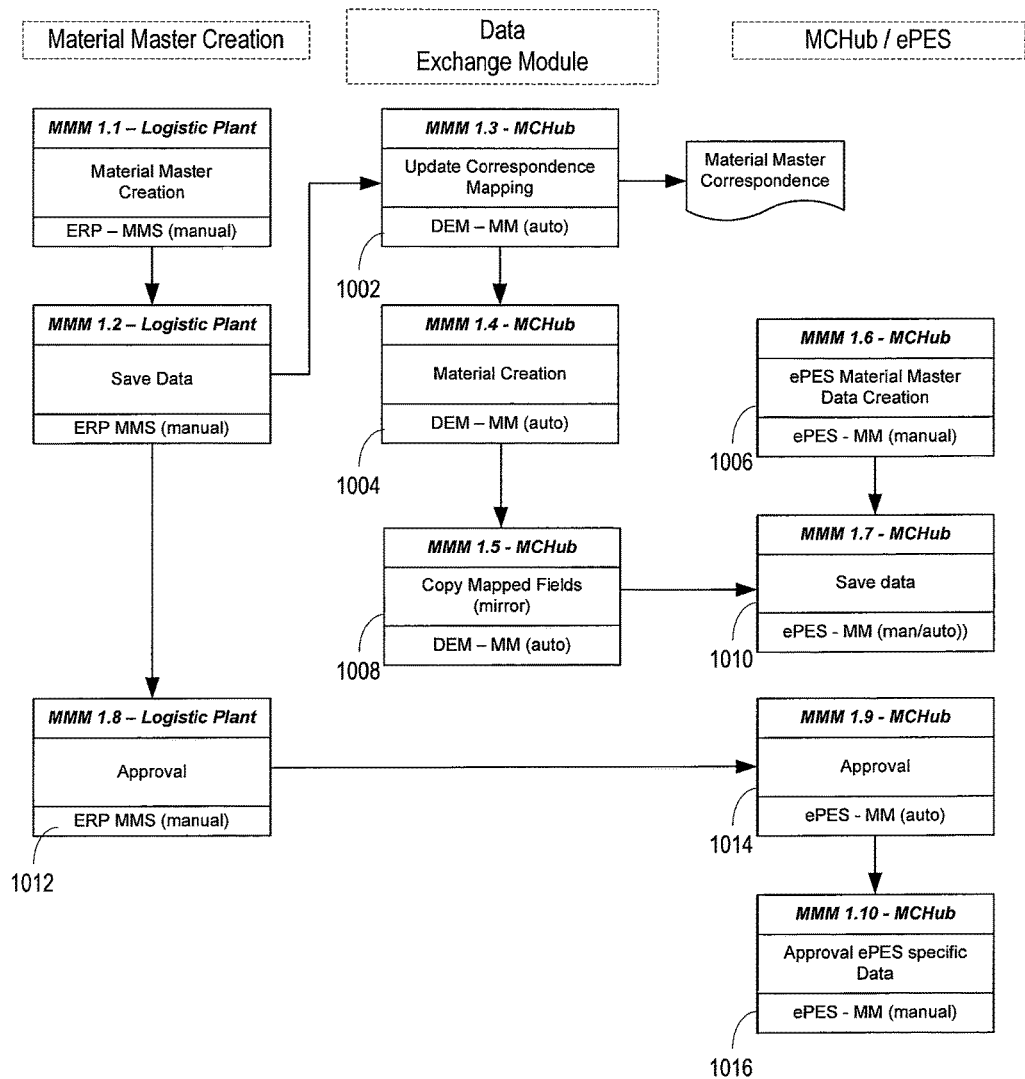
FIG. 10 shows the logic flow that a virtual manufacturing network may take to manage material master creation.

FIG. 9 shows the logic flow that a virtual manufacturing network may take to manage the status of a batch. The batch disposition, usage decision and the electronic batch record management are performed on MCHub 104 using ePES 106 tools. The batch status change for a FG/HFG at the usage decision is communicated to LP in order to reflect the change on the plant where the stock is located.

Finished and half finished goods are transferred to the LP when a goods receipt (902) is performed on MCHub 104 so that the produced goods may be accounted for in the LP financials and considered by the planning process when the produced goods are declared. Half-finished good are available for batch allocation and staging in packaging process orders. Batch disposition, usage decision and the batch record management are performed on a batch of material, although the quantity of the material may not be represented in MCHub 104.

Quality management (QM) objects used to maintain batch status management include the inspection lot created (904) in MCHub 104 and the corresponding QM object created (906) in the LP, linked by a common material code and/or batch code. The inspection lot on MCHub 104 is created for the FG/HFG at the moment of process order release. The quality report is created (906) when the produced FP/HFP is registered in the LP.

The alignment of the batch status (910) between logistics plants may be performed through the use of a follow up action (908) that the logistics plants use to modify the batch master on the logistics plants where the batch is registered when the usage decision (912, 914, and 916) is taken in the LP and/or MCHub 104.

The alignment of the batch status (910) may be invoked in the following scenarios: 1) batch disposition and usage decision registered in MCHub 104 on a FP/HFP using ePES 106 batch disposition; in this case the usage decision registered in the inspection lot on MCHub 104 is transferred in the ERP system in LP, where the lot status of the corresponding material/batch is modified according to the characteristics of the LP; and 2) a usage decision registered in the LP on a raw material/batch FP/HFP using the available QM functionalities; the UD registered in the LP is transferred to MCHub 104 in order to update the inspection lot related to the modified material/batch, in order to keep the batch master information updated, since ePES 106 performs real-time checks on the batch master data during production activities 240.

Once the produced goods are transferred from MCHub 104 to the LP, a QM object is created (906) in LP in order to track the batch status information related to the component. An inspection lot (904) is created in MCHub 104. The batch disposition is performed by the batch selection through inspection lot code logic (918) that allows the user to access the batch disposition functionality. The batch record archiving logic (920) stores batch record data and the checklist evaluation logic (922) prompts the user to check and evaluate the batch record, and set the batch status to "available" for judgment.

The usage decision recording logic (912) communicates the batch status to the follow up action usage decision transfer logic (908), which communicates the usage decision status and the usage decision code to a QM object (916) in the LP for the produced material/batch. The material code and batch number link MCHub 104 inspection lot and the LP QM object, where the material code may be a unique code common to both MCHub 104 and LP. The batch number may be unique to the LP and communicated to MCHub 104.

DEM 226 communicates the usage decision recording on inspection lot (912) to the LP so that the material stock status alignment (910) may be performed. The final usage decision (914) sets the status for the batch to "Approved" and the inspection lot is closed (924). The final usage decision (914) may invoke a follow up action (908), so that the usage decision recording (916) occurs on the LP and related stock status alignment (910) is performed.

Stock adjustments and stock movements may be performed on the LP for materials, batch and quantities that are not in not-blocked WM status (e.g. sampling, scrapping, and goods issued to cost center). A part of the available stock is transferred to MCHub 104 for the production activities 240 and the available stock is tracked in LP through the block of warehouse movements. In order to perform a stock movement on a quantity in MCHub 104, the available stock is transferred to LP in unblocked status and then the inventory movement may be performed. Also batch splitting is performed on LP. For example, where batch splitting is needed in MCHub 104, the stock may be transferred LP in order to perform the batch splitting and the quantity transferred to MCHub 104 after batch splitting is set from blocked storage status into unblocked status.

Table 6 lists process descriptions for the batch status management logic flow shown in FIG. 9.

TABLE 6

Process Descriptions

| | Batch Disposition Management | System |
|---|---|---|
| BSM 5.1 | Goods receipt | the virtual manufacturing network (manual) |
| BSM 5.2 | Quality Report Creation | ERP - QMS (auto) |
| BSM 5.3 | Inspection lot Creation | MCHub 104 - QM (auto) |
| BSM 5.4 | Batch selection Through Inspection lot. code | the virtual manufacturing network - PP - PI (Manual) |
| BSM 5.5 | Batch record Archiving | the virtual manufacturing network (auto) |
| BSM 5.6 | Checklist Evaluation | the virtual manufacturing network (manual) |

TABLE 6-continued

Process Descriptions

| | Batch Disposition Management | System |
|---|---|---|
| BSM 5.7 | Usage decision recording on Inspection Lot | the virtual manufacturing network - QM (manual) |
| BSM 5.8 | Follow Up Action Usage decision Transfer | DEM - QM (auto) |
| BSM 5.9 | Usage decision Recording on Quality Report | ERP - QMS (auto) |
| BSM 5.10 | Material Stock status Alignment | ERP - MMS (auto) |
| BSM 5.11 | Final Usage decision | the virtual manufacturing network - QM (manual) |
| BSM 5.12 | Inspection Lot Closure | the virtual manufacturing network - QM (auto) |

In case of a SAP™ based ERP system in the LP, MCHub 104 flows that activate actions to be performed in the LP can be executed using standard SAP™ functions, while LP flows that activate data transfers into MCHub 104 may be performed using triggers (e.g., "user exits" and/or similar functions that invoked logic when an event occurs for a object that is being processed), with minimal impact on a logistic plant employing SAP® system of the Logistic Plant (e.g. the saving action on LP using SAP™ COR2 transaction initiates the data transfer of the information related to the new released process order into MCHub). In one implementation, standard SAP™ Idoc (intermediate document) may be used to transfer the information across systems in the virtual manufacturing network. SAP™ Idoc is a standard data structure for electronic data interchange (EDI) between application programs written for SAP™ business system and/or between an SAP™ application and an external program. Standard SAP™ Idocs may be implemented for most of the process flow documents (e.g., process orders, materials transferred, and batch master mirroring). The process order creation management may send an SAP™ Idoc for each process order created on the LP and may need a feedback flow to ensure that a corresponding process order is created on MCHub 104 so that a corresponding mapping functionality is established. Automations in the material management flows manage the resident warehouse management system of the logistic plants, since the logical material flows towards supply areas in all-SAP environments are redirected to MCHub 104 by the DEM 226. The transfer order confirmation for a material staged into the production storage type may cause DEM 226 to read the reference process order of the related transfer requirement and responsively perform the material transfer. The material transfer may result in a material movement goods receipt (Movement type 501) in MCHub 105. The DEM 226 may create warehouse movement transfer orders for the transferred materials in the appropriate location (e.g., information about material/batch/quantity and the batch master may be transferred via 'Idocs'). DEM may block the WM status for component materials sent to production by setting a lock at WM quantity level on the LP, so that MCHub 104 controls the WM management of those component materials. Stock variations that result from production activities 240 (e.g., materials consumption and goods receipt) that DEM 226 may manage MM movements on the LP and related WM transfers to appropriate supply areas.

The sequence of actions to be performed due to the materials movements on MCHub 104 may be summarized as follows: 1) materials consumption movement on a process order (movement type 261) may be invoked on MCHub 104 and the same consumption with the same movement type is then executed on the LP. 2) the goods receipt against a process order (movement type 101) may be initiated on MCHub 104, and the same goods receipt with the same movement type may then be performed on the LP. The stock is removed from MCHub 104 at the process order closure using a dedicated MM movement type to execute the goods issue.

Related to the Batch Status updating functionality (batch disposition) and to batch status of components, as the inspection lots of the two plants referring to the same FG/HFG batch or component materials might have different types, the inspection lot and Batch status Update is performed through a dedicated Follow-Up action, which manages the batch status update across the different landscapes. Anyway further assessments are needed at functional specifications stage.

The batch status management flow is also influenced by the LP, as the batch status update will not be performed by the SAP™ follow-up functionality of the Data Exchange module, so the integration has to be considered depending on the LP Quality Management System. The Operation Confirmation and process order closure is based on the structure of a standard SAP™ process order, so both phase statuses and costs have to be acquired by the LP production planning system referring to its own production accounting. In any case, a minimal set of information is used to ensure the exchange of data across plants. A first list of objects which can be converted and copied from the ERP system into MCHub 104 is provided below. A full list of objects to be mirrored can be provided after a further detailed assessment on the characteristics of the ERP system. The objects not included in the list are proposed to be manually created and approved in MCHub 104 using the current Master Data procedures already in place in the SAP™ systems where the ePES 106 solution is running.

As noted above, the DEM 226 implements master data management. In particular, the set of production master data used in the virtual manufacturing network (VMN) functionality (e.g., the MCHub functionality) may include objects which already exist in any logistic plant and may be copied to the VMN, where they will be modified in accordance with production system (e.g., the ePES) standards. As noted above, "ePES" may be used to refer to a production system without any loss of generality to applicability to any specific type of production system. Similarly, the VMN may be referred to below as the manufacturing collaboration hub ("MCHub") described above. However, other implementations of a hub may be used in a virtual manufacturing network. Underlying the master data management is that maintenance of the master data is generally performed in one of the two systems (e.g., the logistics plant or the VMN) and automatically aligned (if desired) on the other system. Two scenarios are given as examples: A) logistics plant is based on pre-selected enterprise software (e.g., SAP™ software), and B) logistics plant not based on that pre-selected enterprise software.

The DEM 226 harmonizes data and production execution by providing a common solution for both the scenarios A) and B) by keeping on the VMN the master data maintenance for all the production system specific master data and to facilitate information exchange between the local logistics plant and the VMN on the basic master data. The technical advantages of this solution include: in both the scenarios the structure of the available master data in the logistics plant may be different from the one expected on the VMN, therefore a mapping and conversion flow may be used, where all the data in the VMN may not be available. In this case the master data maintenance is much more efficient if it is kept on the VMN, where the dedicated master data tools are implemented (e.g., through a usability layer) without any impact on the logistics plant. Automatic data alignment between the logistics plant and the VMN is performed for specifically defined data (e.g., material status change in the logistics plant to be reflected into the VMN material status, recipe operations structure, or list of components in the BOM, as examples).

In both scenarios the master data definition on the VMN is one step of the data definition process: master data will be created and maintained on the VMN using Change Management tools (e.g., SAP™ Change Management tools) and then copied in the local logistics plant. Both the scenarios are described in more detail below, describing a model for the master data management which applies in both the cases with the same process flows. Specific differences in terms of technical solutions needed are also described below.

Material master integrity is one principle driving the design of the Material Master data flow. The guidelines of the design are the following: 1) the material master may have creation and maintenance performed on the logistic plant where the basic data are defined, 2) the material master will be mirrored on the VMN for the product system relevant data, and 3) the production system specific data will be maintained on the VMN.

In one implementation, the material master is maintained on the logistics plant, where the database views not specifically needed for the production system may be maintained. However, every creation and/or change of materials may be reflected in the VMN through the functionality of the DEM 226. The material master specific data defined on the logistics plant will be then copied, using the DEM 226, to the VMN by creating the related material master views and converting data values according to predefined conversion rules. In the example shown in Table View Definition below, there is a list of material master views relevant on the VMN, where the second column reports if the view contains master data to be copied from the logistics plant ("LP") to the VMN.

The Table View Definition may be implemented in memory in the VMN (e.g., in the DEM 226) and/or in each LP as a material master views definition specifying: a material master view identifier (e.g., "Basic Data 1") for a logistics plant material master view, a virtual manufacturing network relevance identifier (e.g., "Yes") for the material master view identifier, and a logistic plant data copy flag (e.g., "No") for the material master view identifier.

TABLE 7

View Definition
Material Master views definition on VMN

| Material Master view | VMN Relevant | Data copy from LP |
|---|---|---|
| Basic Data 1 | Yes | Yes |
| Basic Data 2 | Yes | Yes |
| Classification | Yes | No |
| Sales: Sales Org. Data 1 | No | — |
| Sales: Sales Org. Data 2 | No | — |
| Sales: General/Plant Data | No | — |
| Foreign Trade: Export Data | No | — |
| Sales Text | No | — |
| Purchasing | Yes | No |
| Foreign Trade: Import Data | No | — |
| Purchase Order Text | No | — |

TABLE 7-continued

View Definition
Material Master views definition on VMN

| Material Master view | VMN Relevant | Data copy from LP |
|---|---|---|
| MRP 1 | Yes | Yes |
| MRP 2 | Yes | Yes |
| MRP 3 | Yes | No |
| MRP 4 | Yes | Yes |
| Work Scheduling | Yes | Yes |
| General Plant Data/Storage 1 | Yes | No |
| General Plant Data/Storage 2 | Yes | No |
| Warehouse Management 1 | Yes | No |
| Warehouse Management 2 | Yes | No |
| Quality Management | Yes | No |
| Accounting 1 | No | — |
| Accounting 2 | No | — |
| Costing 1 | No | — |
| Costing 2 | No | — |
| PES Master Data | Yes | No |

The copy activity is carried out with the DEM 226. As the changes are saved in the LP system, the mirroring process is activated for the selected views and the data are copied and acquired in the system that hosts the VMN, performing a value conversion if desired between the values in the LP and the specific values needed in the VMN. In other words, the DEM 226 may read the data saved in the LP and send data messages to the VMN to mirror specific views as directed by the View Definition table. Alternatively, the LP may send messages, through the communication hooks noted above, conveying view data for all database view changes to the DEM 226, which may consult the View Definition table to decide whether to mirror the data to the VMN.

A high level example of information for which a data conversion may be implemented between the LP ERP and the VMN is reported in the table below.

TABLE 8

Example of data conversion between ERP on Logistic Plant and MCHub

| MCHub MM view | Relevant Field | Data conversion specifier: Conversion proposal on MCHub plant |
|---|---|---|
| Basic Data 1 | Material Group | Material group to be copied on MCHub. |
| Basic Data 1 | Material Type | Material type to be copied on MCHub. |
| MRP 1 | Assembly scrap | To be copied (if defined in the LP) |
| MRP 2 | Batch entry | Always blank on MCHub |
| MRP 2 | Issue Storage location | Storage location to be copied in MCHub; if not possible, issue storage location to be maintained manually on MCHub. |
| MRP 2 | Backflush | Always blank on MCHub |
| MRP 4 | Component scrap | Component scrap to be copied in MCHub; if not possible, it needs to be maintained manually on MCHub. |
| Work Scheduling | Production Scheduling Profile | To be manually maintained on MCHub |
| Work Scheduling | Unit of issue | Always blank on MCHub |
| Work Scheduling | Batch record required | Always blank on MCHub |
| Work Scheduling | Batch Management | Always checked on MCHub |
| Work Scheduling | Tolerance data: Underdelivery/Overdelivery tolerance | Goods receipt tolerance to be copied in MCHub; if not possible, it needs to be maintained manually on MCHub. |
| PES Master Data | All fields | To be maintained manually on MCHub |

Since the Classification view hosts production system related data, it is maintained on the MCHub for the part related to the production system relevant classes. Regarding maintenance and with reference to FIG. 10, the creation and the change processes of a material code are described.

Creation:

The creation of a new material code will be performed with the standard usual procedure on the LP. Then, an automatic mirroring through the DEM 226 will create the same material code on the MCHub. Due to specific system constraints, materials may be created with different material identification codes on the LP and on the MCHub. In the process the Material master mapping functionality is executed, which is responsible for updating (1002) the material master correspondence hosted on the MCHub. In this functionality a one-to-one correspondence between material master identity numbers is mapped, so that at each creation of a material master on the LP, a corresponding Material master is created (1004) on the MCHub.

The Material Master creation functionality creates a Material master, and may activate the material master views (1006) (e.g., according to a list provided in a "definition" paragraph). In case a data conversion is needed on the values to be copied from one database to the other, the conversion is performed according to rules defined in the data exchange module 226. For each field the new Material master will copy the values when the mirroring (1008) is activated. If it is not activated, the Master data team will execute the validation of the production system specific settings in the MCHub.

It should be noticed that several fields may be set as "blank" on the MCHub (e.g., Batch entry, Backflush, Unit of issue, Batch record) in order to comply with the production system standards. In this case, and in any other case where a specific production system setting should be present, the VMN or DEM 226 may apply a conflict rule to overwrite the copied values with the production system settings.

At the end the data are saved (1010). When the approval process is completed on the LP (1012), the approval is then transferred into the MCHub on the data copied/converted from the LP (1014). A dedicated approval on the production system specific data may then occur on the material master views specific to the MCHub (1016).

Figure 11:
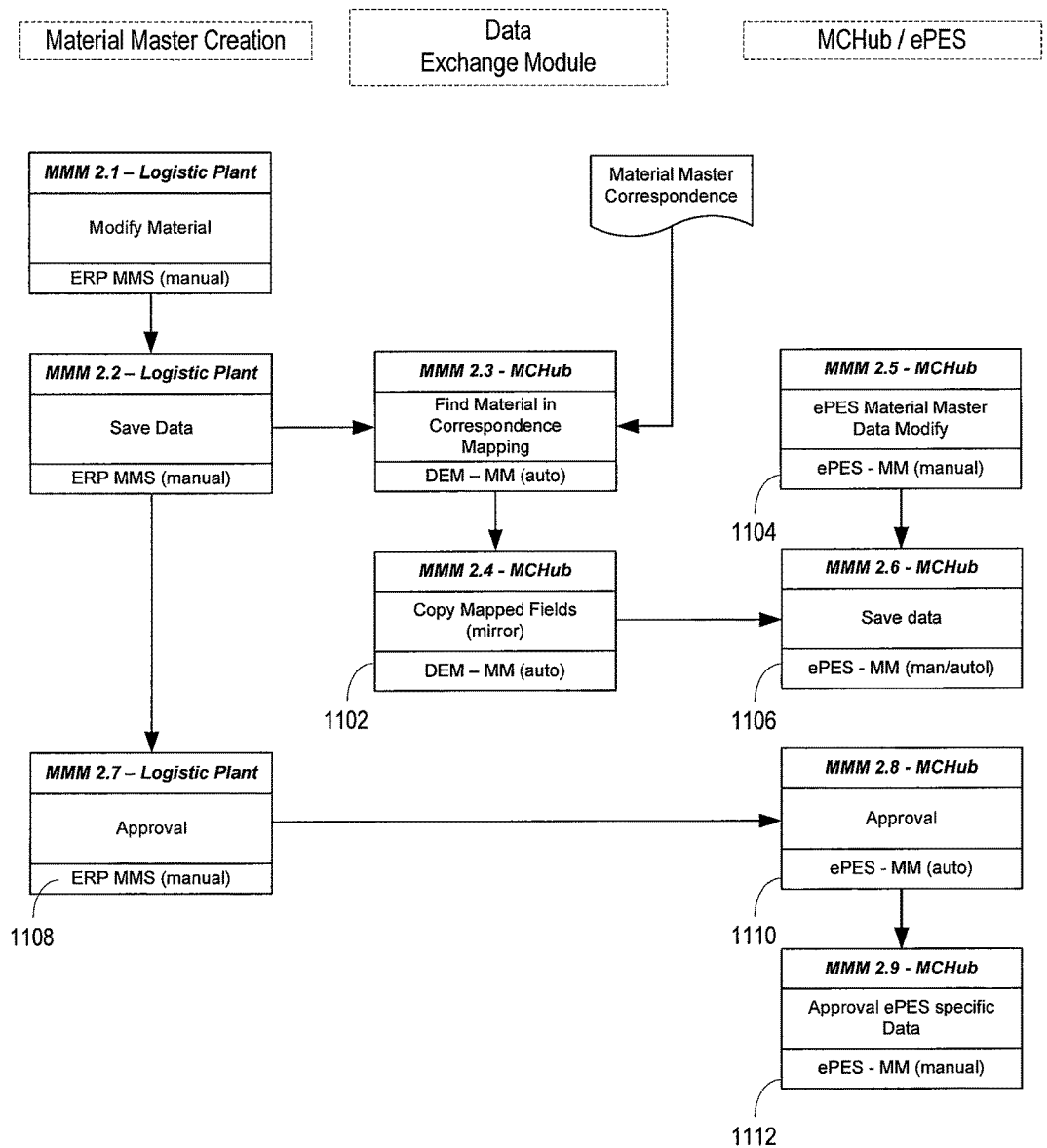
FIG. 11 shows the logic flow that a virtual manufacturing network may take to manage material master modification.

Change:

With reference to FIG. 11, the change of a production system relevant material on the LP activates the corresponding material change through a specific trigger sent to the Data Exchange module 226. In particular, the Material Master mirroring functionality (1102, 1104, 1106) finds the corresponding material on the MCHub by using the Material Master mapping functionality and changes the data on the MCHub leaving unchanged each field not included in the change.

When material is approved on the LP, the approval is automatically transferred on the corresponding MCHub material code (1108, 1110, 1112). In case of material master changes performed in the production system view, a separate approval may be provided to the MCHub, without impact on the material master approval on the LP and on the general material master approval on the McHub.

The deletion of a material on the LP is managed in the MCHub by setting a deletion flag at the material level as currently available in the standard SAP. The Table below enumerates the flows shown in FIG. 10 and FIG. 11.

TABLE 9

Process Description
Material Master Management

| 1 | ID | Material Master Creation | System |
|---|---|---|---|
|  | MMM 1.1 | Material Master Creation | ERP MMS (manual) |
|  | MMM 1.2 | Save Data | ERP MMS (manual) |
|  | MMM 1.3 | Update Material Master Correspondence Mapping | DEM - MM (auto) |
|  | MMM 1.4 | Material Creation | DEM - MM (auto) |
|  | MMM 1.5 | Copy Mapped Fields (mirror) | DEM - MM (auto) |
|  | MMM 1.6 | ePES Material Master Data Creation | ePES - MM (manual) |
|  | MMM 1.7 | Save Data | ePES - MM (manual) |
|  | MMM 1.8 | Approval | ERP MMS (manual) |
|  | MMM 1.9 | Approval | ePES - MM (auto) |
|  | MMM 1.10 | Approval ePES Specific Data | ePES - MM (manual) |
| 2 | ID | Material Master Modify | System |
|  | MMM 2.1 | Modify Material | ERP MMS (manual) |
|  | MMM 2.2 | Save Data | ERP MMS (manual) |
|  | MMM 2.3 | Find Material in Correspondence Mapping | DEM - MM (auto) |
|  | MMM 2.4 | Copy Mapped Fields (mirror) | DEM - MM (auto) |
|  | MMM 2.5 | ePES Material Master Data Modify | ePES - MM (manual) |
|  | MMM 2.6 | Save data | ePES - MM (manual) |
|  | MMM 2.7 | Approval | ERP MMS (manual) |
|  | MMM 2.8 | Approval | ePES - MM (auto) |
|  | MMM 2.9 | Approval ePES Specific Data | ePES - MM (manual) |

Master Recipes:

The production system generally allows the creation of complex recipes, which activate specific production system functionalities (e.g., points of usage for dispensed materials, process steps, batch disposition). The information needed by the production system to enable manufacturing execution system (MES) capability may use a recipe redesign process. To allow a single model for SAP™ and non-SAP LPs, the production system recipe may be created and maintained on the MCHub. The creation and maintenance of a production system recipe may be reflected as a "lean" recipe (e.g., a less complex version of the full recipe) that is maintained on the LP.

The Data Flow model for Recipes may include: 1) since a recipe redesign may be performed as the production system needs (and allows) more complex recipes, the solution to avoid double data maintenance is to keep the creation and modification of new production system recipes directly on the MCHub; 2) already existing recipes of the LP will be migrated to the MCHub and then will be redesigned to become production system recipes; and 3) the creation and modification of recipes on the MCHub will trigger a mirroring function that will create and/or modify a corresponding lean recipe on the LP. Since recipes may be different, the mirroring function will apply data conversion rules to create and/or modify recipes on the LP.

In the MCHub, the recipe will be designed (or redesigned in case of existing recipes) according to the production system standards by using the production system "Usability Layer" module, which offers a user friendly environment for recipe design, with specific functionalities enabling a smart structure of linked process instructions. The Data Exchange module 226 will then copy the lean recipe, suitable for costing and planning purposes.

The correspondence of the two recipes (lean recipe and the production system recipe) may be tracked by a mapping table. The corresponding recipes are therefore used when releasing "twin" Process Orders both on the LP with the lean recipe and on the MCHub with the production system recipe. The mirroring procedure for maintenance will take into account whether the LP system is based on standard software (e.g., SAP) or not, since the structure of the document to be sent depends on the capabilities of the LP system.

A standard set of information will be sent to the non-standard software LP system to have recipes aligned across plants. The information may include: operation structure, materials assignment to operations, material quantities (at operation level), and resources involved. In this way the operation confirmation and process order closure on MCHub can trigger a consistent data transfer across plants, since both Process Orders are based on a same-structured recipe.

Information related to phases (phases structure, materials assignment to phases, material quantities at phase level) may be transferred to the Logistic Plant. Regarding header materials, the material identity may be different and functionality ensures the corresponding mapping of the materials. Regarding production versions (PV), the PV may be the combination of a Recipe (identified as Recipe Counter within a Recipe Group) and a Bill of Materials (identified as Alternative for a BOM).

Even though many valid Production Versions may exist for a header material on the Logistic Plant, the present MCHub may define a single valid Production Version when creating a Process Order. In case a need exists in order to keep more than one valid production version on the MCHub, the process order creation and release flow may be checked in order to provide for the selection of the PV among a list of valid PVs.

Regarding Operations, the current recipes of Logistic Plants present each stage of the production mapped in the recipe as an operation with the relevant phases inside, with materials assigned to the production phase without further distinction about the usage of the material. The production system allows a more detailed mapping of the material assignment and usage to the points of usage for dispensed materials, each point of usage representing a specific stage of the production on a resource where a material or a set of materials are used with defined quantities. The DEM 226 may ensure that the lean Recipes in the LP may inherit the same structure of Operations from the ePES recipes on the MCHub: in the mirroring process the production system recipe will be copied on the LP without the production system specific settings, so that the Logistic Plant can acquire the transmitted recipes in its own environment.

Consequently, it is possible to enable that: 1) the Operation confirmation on the MCHub triggers the Operation Confirmation on the LP with one-to-one reference to corresponding operations, and 2) resources employment and their cost accounting on the MCHub will refer to operations related to corresponding operations on the LP, resulting in consistent Costing calculations for the production execution. The operation structure of the existing recipes migrated to MCHub will be maintained as much as possible during the recipe redesign process. The Dispensing operation may be present, with a numbering that ensures Dispensing to be the first operation. No dummy dispensing operation is necessarily needed by MCHub if a recipe does not foresee usage of dispensed fragments.

Regarding Phases: The production system standard functionalities allow managing the points of usage for a dispensed materials, each point of usage representing one or more materials to be used in a single phase with defined quantities. Therefore, the splitting of operations into phases may be used in formulation Process Orders, in order to respect as much as possible the real activities related to the different dispensed materials. Whether the operations have no phases on the migrated recipe, phases may be inserted in the recipe redesign process on the MCHub.

The creation of phases for an Operation in the recipe redesign will follow these criteria: 1) A "Closure" phase may be used; 2) One phase may be used for each Point of Usage if desired; and 3) Phases will be shaped upon the actual production process. In order to avoid overcrowded sets of process instructions per phase, a congruous number of phases will be created. In case details upon phase confirmation can be sent to the LP, each phase confirmed on the MCHub will trigger the confirmation of the corresponding phases on the LP. The confirmation of the phases in the actual production system standard follows a concatenation of phases: the "Goods Receipt" phase is set as milestone and it confirms all the preceding phases of the Operation, while the "Closure" phase confirms all the phases from the phase subsequent to the Goods Receipt to the last one. The confirmation of each phase in the logistic plant will be reported based on the inputs coming from the production data inserted in the MCHub.

The cost acquisition in the ePES standard is manual and performed at the closure phase: all the costs are input by the operator into a form, requiring the valorization of the standard value fields for each section. Therefore the cost valorization is acquired with no reference to default standard values eventually present in the recipe for phases other than the last one in each section (a section is a set of phases within the same operation with an identical standard text key: e.g., setup, run, closure. Actually sections are used in any ePES recipe.)

Regarding Process Instructions—Usability Layer: the Process Instructions explain to the production operator how to perform the actions in a single phase of an operation. The ePES system allows an enhanced management of Process Instructions, such as dynamic calculations performed on the PI-Sheet. The Usability Layer module of ePES may be present on the LP, so that the redesign of the recipe in accordance with ePES standards can be performed in a user-friendly and time-saving way. As the recipe will align from the MCHub to the LP, the process instructions are not mirrored as they cannot be defined on the LP. The lack of process instructions do not impact the LP since the process instructions sheet (PI-Sheet) is generally opened on MCHub.

Regarding Resources: Resources defined on the Logistic Plant are copied on the MCHub and assigned to Operations with consistency across plants, as the same Operation structure of the Recipes is present on the MCHub. The definition of the Cost structure is set through a basic implementation of the Finance and Controlling module that is put in place on the MCHub. According to the ePES standard, the present resources have a cost structure based on the item Setup time, Workforce Time and Machinery Usage time. Therefore, the actual ePES costing functionality may request the user to input the employed time for each cost item. The gathered data is then acquired by the Controlling system. The maintenance of different Cost structures for a resource may be valuated according to the business constraints for the MCHub implementation.

Once the resources are defined on the MCHub, the alignment maintenance of the resource parameters is automated due the mirroring functionality. The mirroring functionality will copy new resources on the MCHub and mirror the changes to existing resources.

The Resource Electronic Logbook functionality is natively provided by ePES and it is also available with the multi-plant management functionalities on the MCHub. In the specific case the same resource is shared for ePES products (MCHub) and for non ePES products (logistic plant), the usage of Electronic Logbook can be still kept on the two plants using manual logbook updates for each non ePES production order worked on the resource and related to the logistic plant (Logbook update is instead automatic for ePES production on MCHub). This logic can be also applied in case of system architecture based on different platforms for the logistic and the production plants.

Regarding Control Keys—Control recipes: the configuration of Control Keys and Control recipes is completely plant-dependent, and refer to ePES-specific Control recipe Destinations, so these parameters of the Recipes may be maintained on the MCHub. Lack of process instructions and/or CRD do not impact the LP since the PI-Sheet is opened on MCHub.

Regarding In-Process Controls: In-Process Controls will be manually defined on the MCHub along with the recipe following the standard ePES template.

Regarding Maintenance, the maintenance of Recipes on the MCHub may result in the creation or modification of a corresponding recipe on the LP. Already present recipes will be migrated to MCHub and then will follow the usual modify flow. The recipe engineering management proposed accommodates the following principles: 1) the Recipe created/modified on the MChub is automatically copied on the LP applying mirroring rules, and 2) The creation of a Recipe is tracked through the Engineering Change Management on the MChub. Approval on the LP is automatic.

Figure 12:
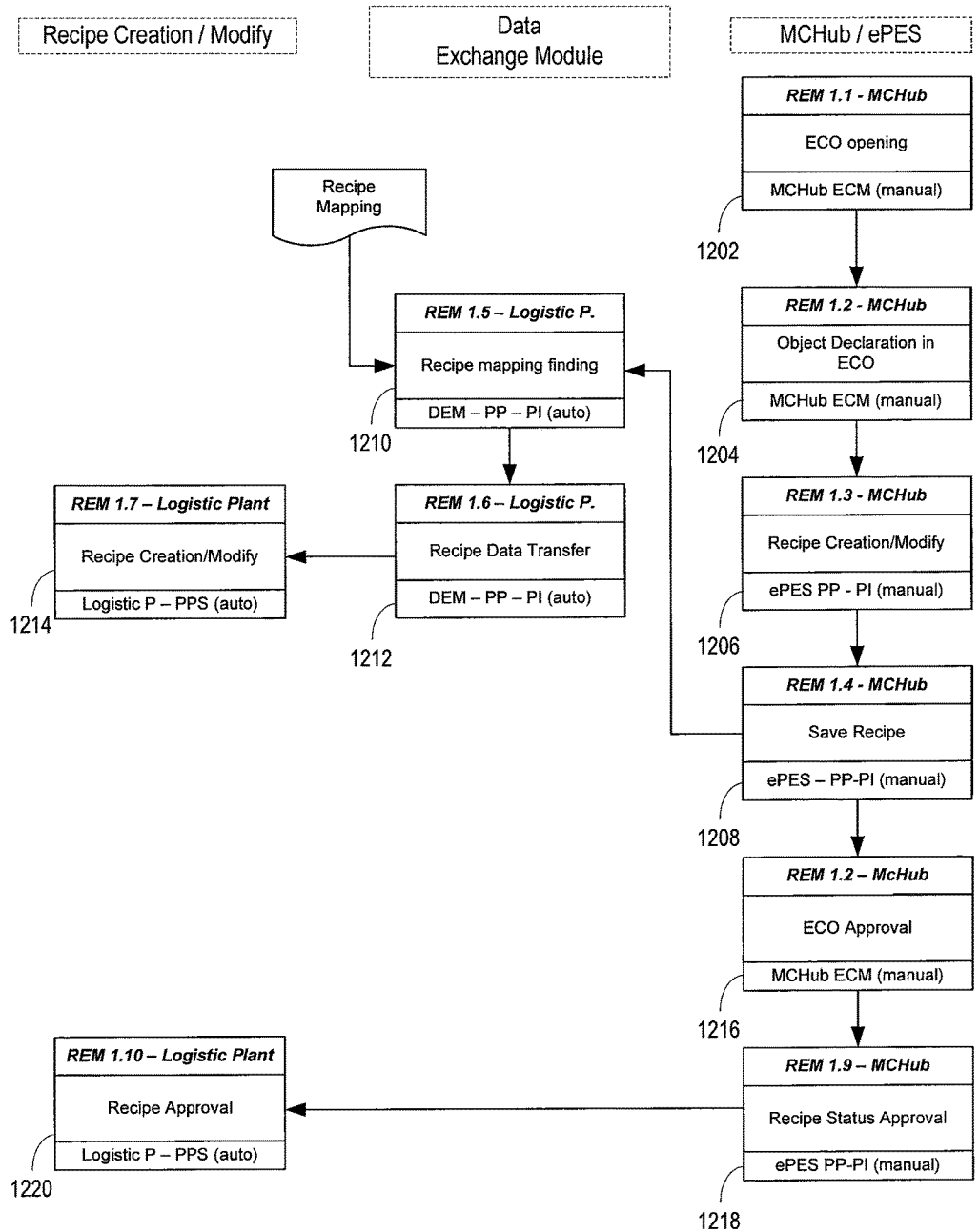
FIG. 12 shows the logic flow that a virtual manufacturing network may take to manage recipe modification or creation.

With regard to FIG. 12, an engineering change order (ECO) is opened (1202) on the MCHub in order to create/modify a recipe. In the ECO, the object to be changed is declared (the recipe) (1204). Then, the operator starts creating/modifying the Recipe, with reference to the Engineering change Order number (1206). When the user calls the Save recipe (1208) command, the Data Exchange module 226 is activated through a "user exit" hooked to the standard Create recipe (C201) transaction. The data Exchange module 226 performs the updating of the recipe mapping 1210, where the correspondence of the pairs of recipe is stored. When creating the recipe, the Data Exchange Module 226 writes on the recipe mapping; when modifying the Data Exchange Module 226 reads from mapping which is the corresponding recipe on the LP which has to be modified by the mirroring process.

The data exchange Module then automatically mirrors the created Recipe on the MCHub, or modifies the existing one mirroring the changes (1212). The mirroring is received by the Logistic Plant, which creates/modifies (1214) the recipe. Approval of the created/modified recipe is automatic, since the creation/modify process is tracked by the Engineering Change Management on the MCHub. The approval of the recipe on the MCHub includes approving the ECO (1216) and changing the recipe status (1218) on the MCHub. The approval of the recipe is then sent to the LP, where the recipe may be automatically approved (1220). The table below enumerates the process flows shown in FIG. 12.

TABLE 10

Process Description
Recipe Engineering Management

| ID | Recipe Creation/Modify | Responsible |
|---|---|---|
| REM 1.1 | ECO opening | MCHub ECM (manual) |
| REM 1.2 | Object Declaration in ECO | MCHub ECM (manual) |
| REM 1.3 | Recipe Creation/Modify | MCHub PP-PI (manual) |
| REM 1.4 | Recipe Save | MCHub PP-PI (manual) |
| REM 1.5 | Recipe mapping/finding | DEM - PP- PI (auto) |
| REM 1.6 | Recipe Data Transfer | DEM - PP -PI (auto) |
| REM 1.7 | Recipe Creation/Modify | Logistic P. - PPS (auto) |
| REM 1.8 | ECO Approval | MCHub ECM (manual) |
| REM 1.9 | Recipe Status Approval | MCHub ECM (manual) |
| REM 1.10 | Recipe Approval | Logistic P. - PPS (auto) |

Bill of Materials:

The Bill of Materials (BOM) is the list of components used to produce a certain header material. As with recipes, ePES creates complex BOMs, enabling specific ePES functionalities such as points of usage and intermediate management. Being more complex, the ePES BOMs might differ from the BOMs already present on the LP. Therefore, as for Recipes, a BOM redesign according to the detailed ePES standard may be implemented in the VMN. The solution is to design the BOMs according to the ePES standards, and to keep the creation and modification of the recipe directly on the MCHub. A mirroring process similar to the Recipe alignment process is established to keep BOMs consistent across plants.

The VMN implements the following for the definition and maintenance of the recipe: since a BOM redesign is needed by ePES, to avoid double data maintenance, the creation and modification of ePES BOMs may be performed directly on the MCHub; already present BOMs of the LP will be migrated on the MCHub and then will be redesigned to become ePES BOMs; the creation/modification of BOM on the MCHub will trigger a mirroring function that will create/modify a corresponding BOM on the LP. Since BOMs are different, the mirroring function will apply conversion rules to create/modify BOMs on the LP.

The mirroring process will create/modify the BOMs present on the LP, copying the information from the MCHub according to the level of detail allowed on the LP system. A standard set of information may be sent to the non-SAP LP system to have BOMs aligned across plants: 1) operation structure, 2) materials assignment to operations, and 3) material quantities (at operation level).

Information related to phases (phases structure, materials assignment to phases, material quantities at phase level) may be transferred to the Logistic Plant. Consistency checks and mirroring rules will be applied in case the LP is not able to acquire the BOMs with information related to phases: calculations will be performed so that material quantities at operation level mirrored on the LP are consistent with material quantities at phase level present on the ePES BOM. Approval processes are mirrored for BOM creations or modifies from the LP into the MCHub, and PO release is blocked for both plants if just one of the correspondent BOMs is not approved.

Regarding Points of Usage: One reason to redesign the BOMs according to the ePES standards, besides the difference of phases, is the distribution of materials into points of usage along the manufacturing process. The ePES dispensing system allows the mapping of where the dispensed materials are used along the process with alikeness to the real-world manufacturing practice. For example, if two different quantities of a certain material have to be used in two different points of usage, the BOM has to list the same material with two different quantities related to two different points of usage in two different phases, whereas the total quantity of that material is reported in the BOM on the LP.

Regarding Item Category: A dedicated setting in the BOMs definition is the Item Category definition for each component. ePES functionality allows managing the relevant item categories for production (materials stock managed, non stock managed, e.g. water). Different item categories currently used in the LP BOMs should be evaluated in order to understand the coverage in the ePES functionalities and the possibility to replace them with different values.

Regarding Scraps: The scrap of a material component is currently managed in the actual ePES standard, as a percentage (or fixed quantity) of a certain material, explicitly reported in the BOM. If the actual management of the scrap quantities is performed manually or informally in the Logistic Plant, with no evidence in the BOMs, the redesign process will configure the ePES BOMs to manage the scraps, so scrap percentages have to be set and the material quantity reviewed. Moreover, as material quantity may be divided into different points of usage, different items may be listed for the same material in the BOM. A coherent scrap strategy has to be deployed in the master data, so that different scraps per different points of usage may be set up, and operation-related scraps have to be set up if the material is split into points of usage of different operations.

Regarding Intermediates: Intermediates are present in the actual ePES BOMs, but a difference may arise if the LP does not have intermediate materials in the BOM. With respect to best practices, the presence of an intermediate material should be correctly identified in the information systems, with the correct quantity reported, location and label identity. To comply with these rules, the ePES system is designed to manage intermediate materials. If the BOM does not manage intermediates in the LP, the BOM redesign process will include the intermediate item into the ePES BOM.

Regarding maintenance: BOMs may be created and modified on the MCHub, and a mirroring process will create/modify a coherent BOM for the Logistic Plant, applying conversions for material quantities. Already present BOMs will be migrated to MChub and then will follow the usual modify flow. The VMN may implement the following: 1) the BOM created/modified on the MChub is automatically copied on the LP, applying mirroring rules, and 2) the creation of a BOM is tracked through the Engineering Change Management on the MChub. Approval on the LP may be automatic.

Figure 13:
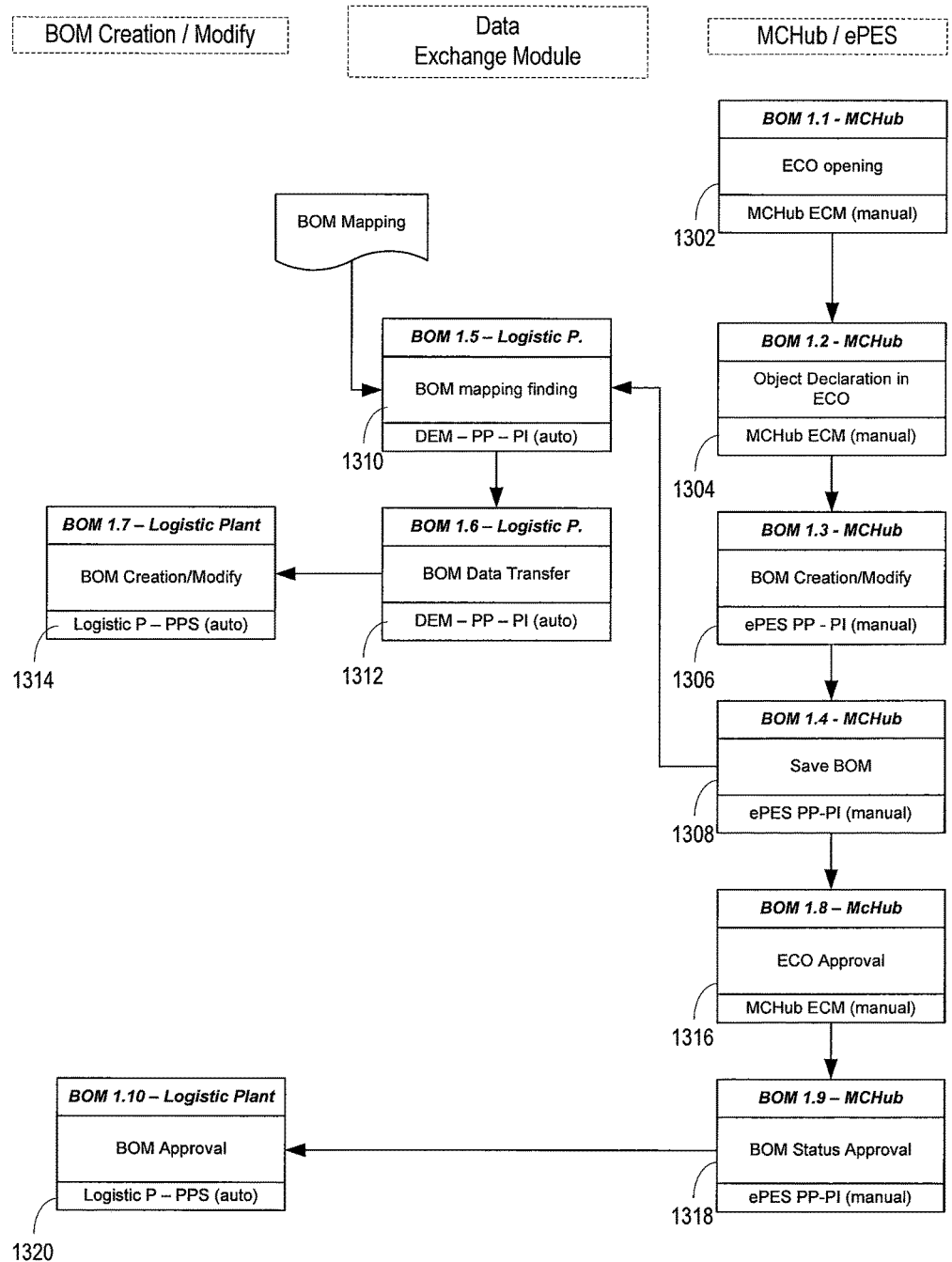
FIG. 13 shows the logic flow that a virtual manufacturing network may take to manage bill of material modification or creation.

With regard to FIG. 13, the process begins with the ECO creation on the MCHub (1302). The BOM is set as the object to be tracked by the ECO (1304). The operator is then able to create or modify the BOM, with reference to the Engineering change Order number (1306). As the user saves the BOM (1308), the Data Exchange module 226 is linked to the standard Create BOM (CS01) transaction. The data Exchange module 226 performs the updating of the BOM mapping (1310), where the correspondence of the pairs of BOM is stored. When creating the BOM, the Data Exchange Module 226 writes the mapping of the corresponding BOMs; when modifying the Data Exchange Module reads from mapping which is the corresponding BOM on the LP which is modified by the mirroring process.

The created/modified BOMs are then automatically mirrored by the Data Exchange Module 226 (1312). The mirroring is received by the Logistic Plant, which creates/modifies (1314) the BOM. The approval of the created/modified BOM may be performed automatically, since the creation/modify is tracked by the ECM on the MCHub. To approve the BOM on the MCHub, operators may approve the ECO (1316) and change the BOM status (1318) on the MCHub. The approval of the BOM is then sent to the LP, where the BOM may be automatically approved (1320). The table below enumerates the process flows shown in FIG. 13.

TABLE 11

Process Description
BOM Engineering Management

| ID | BOM Creation/Modify | Responsible |
| --- | --- | --- |
| BOM 1.1 | ECO opening | MCHub ECM (manual) |
| BOM 1.2 | Object Declaration in ECO | MCHub ECM (manual) |
| BOM 1.3 | BOM Creation/Modify | MCHub PP-PI (manual) |
| BOM 1.4 | BOM Save | MCHub PP-PI (manual) |
| BOM 1.5 | BOM mapping/finding | DEM - PP- PI (auto) |
| BOM 1.6 | BOM Data Transfer | DEM - PP -PI (auto) |
| BOM 1.7 | BOM Creation/Modify | Logistic P. - PPS (auto) |
| BOM 1.8 | ECO Approval | MCHub ECM (manual) |
| BOM 1.9 | BOM Status Approval | MCHub ECM (manual) |
| BOM 1.10 | BOM Approval | Logistic P. - PPS (auto) |

Technical solutions have been designed in order to ensure the correct data exchange between the two systems. The master data and production information needed on the MCHub is present and can be provided by the ERP system in the LP. The DEM 226 provides an integration layer with automatic interfaces and data exchange between the two systems.

In the case of a system based on selected software (e.g., a SAP™ based ERP system) in the production site, the actions requested to be performed in the LP can be executed using standard functions (e.g., SAP™ functions). The actions to be transferred into the MCHub can be performed using triggers like "user exits" or similar functions launched at the saving on the object being processed (e.g. the saving action on SAP™ MM01 transaction triggers the data transfer of the information related to the new material code into the MCHub).

Material master changes and approval processes between the local ERP system and the MCHub can be triggered and monitored using standard SAP™ Change Pointers defined on the Material Status fields in the SAP™ MM views. At each change of the field content in the source system, the related value is transferred via standard Idoc in the destination system; the value can be converted before being sent through a dedicated conversion rule defined in the DEM.

Recipe/BOM approval processes are performed in the MCHub using Engineering Change Management (ECM) objects; if the ECO management is active also on the SAP™ system in the LP, the following options can be selected: 1) ECO management not active for the recipes/BOMs already managed via ECO in the MCHub, and 2) ECO copy in the LP based on the information available in the MCHub (validity dates, objects, etc.). With the first option the redundancy of data is reduced since the complete definition of the recipe is performed in the MCHub where the approval is given, while the basic recipe/BOM data are copied in the LP. The second option can be considered in case the recipe in the LP contains critical data from a compliance perspective (GxP—Good Practice quality guidelines and regulations), which require a dedicated approval flow.

In the case of a system not based on selected software (e.g., a non-SAP based ERP system) in the production site, both the inbound processes (from LP to the MCHub) and the outbound processes (from MCHub 104 to the LP) may be developed in order to match with the feedback messages and other information flows related to the progress of the data exchange applications available in the local ERP (e.g. warnings about updates not executed to be acquired by the DEM).

An example list of objects which can be converted and copied from the local ERP into MCHub is given in Table 12 below. Objects not included in the list may be manually created and approved in MCHub using the master data procedures in place in SAP® systems where ePES is running.

TABLE 12

| Non-SAP system configuration - preliminary gap overview - DATA FLOWS | | | | | |
|---|---|---|---|---|---|
| Direction | Flow | Local ERP action | MCHub action | Exchanged information required | Comment |
| Inbound | Material Master Creation | Local ERP sends a structured data file at each creation of material master. | MCHub receives and acquires data, performs the reading and formatting of incoming files, opens the material master views defined and inserts the mirrored data in the ePES relevant fields, eventually modifying incoming data with relevance to updated correspondence table. | Material Master basic data | Data copied from LP into MCHub SAP ™ system and converted applying the defined conflict rules. |
| Inbound | Material Master Update | Local ERP sends a structured data file at each modify of material master or at any approval status change | MCHub receives and acquires data, performs the reading and formatting of incoming files, reads the correspondence mapping to find the correspondent Material, inserts the mirrored data in the ePES relevant fields, eventually modifying incoming data with relevance to updated correspondence map. | Material Master basic data | Data copied from LP into MCHub SAP ™ system and converted applying the defined conflict rules |
| Outbound | Master recipe creation | Local ERP receives the data from the MCHub and creates a recipe according the specific creation rules. | MCHub sends a structured data information including the recipe and header material reference, the operation structure and any other basic information needed in the local ERP in order to create a recipe. | Recipe reference | Recipe number correspondence may be mapped with one-to-one reference to keep master data consistency across plants. |
| | | | | Header material reference | Header material mapped through the material code mapping functionality. |
| | | | | Operation structure | Operation structure/resources copied into the LP if required in order to map the costing aspects of the process. |
| | | | | Recipe approval status | Approval status information is transferred in the LP, in order to trigger an automatic approval flow. |
| Outbound | BOM creation/ modify | Local ERP receives the data from the MCHub and | MCHub sends a structured data information including the BOM and header material reference, material list and quantities plus any | BOM reference | BOM number correspondence needs a mapping with one-to-one reference to keep master data consistency |

TABLE 12-continued

Non-SAP system configuration - preliminary gap overview - DATA FLOWS

| Direction | Flow | Local ERP action | MCHub action | Exchanged information required | Comment |
|---|---|---|---|---|---|
| | | creates a BOM according to the specific creation/ change rules. | other basic information needed in the local ERP in order to create a BOM. | BOM header material reference | across plants Header material mapped through the material code mapping functionality. |
| | | | | BOM component materials and quantities | BOM copied with material codes mapping and quantities. Intermediate codes may be deleted from the list of materials to be imported if they are not managed in the local ERP. |
| | | | | BOM approval status | Approval status information is transferred in the LP, in order to trigger an automatic approval flow. |

In one implementation, labels management in MCHub 104 employs the labels printing of ePES 106 as a template. Labels management in MCHub 104 may integrate with the specific label types found in the multiple logistic plants that intend to connect to MCHub 104. In order to minimize the impact on the existing LP functionalities, the information printed on the label for each label type managed in the ePES 106 may be adapted to the specific layout of the production site. Labels printed through the ePES 106 functionalities and intended for use in subsequent steps of a logistic plant (e.g. shipping processes and warehousing) may be customized needed in order to meet the requirements of the logistic plant.

SAP™ print architectures may rely on a centralized architecture driven by a SAP™ server. To avoid interfering with the present architecture of Logistic Plants, and to match the printing needs in case of different ERP systems, the centralization of printing is overridden by MCHub 104 printing architecture, derived from the actual ePES 106 standard. The whole setup of the system is very simple with virtually no effort needed. The basic principles of the architecture are: The SAP™ server, for each kind of document, can print as usual or can redirect the printing job to the same client that has requested the print. For each kind of document, the SAP™ server can redirect to a different printer installed on the client. The client's printer driver, called by SAP™ for a certain document, is addressed to the IP of the local network printer, which serves both the single clients and the SAP™ server.

The whole architecture is designed to comply with the technical reason that ePES 106 system requires the printing of a set of labels, with a predefined layout, some of them containing barcodes. As the layout of the centralized SAP™ server print spool may be different or needing customization, the work around is to prepare the layout from within ePES 106 and to redirect the print job to the clients. The client has to install the printer driver(s), with the IP address of the LAN printers correctly set up. Moreover, the client has to install the barcode DLL to allow the codification of defined text strings into barcode images. The SAP™ system is configured as follows: each client has a set of printers enabled with a name. The printers of interest for ePES 106 are set up as "frontend" printers, meaning that the print job has to be redirected to the client. For labels containing barcodes, the device type is set as "YSWIN", so that the SAP™ standard interpreter is used to set up the text strings convertible into barcode images (many barcode standards are supported). The same name may be kept in the SAP™ server and in the client operating system.

A custom ePES 106 table available is the YERPRINT-PAR, which records for each user which has to be the default printer for a single type of document. Therefore when the user has to print a certain type of label (e.g. dispensing label) in ePES, this table is read to forward the print job to the correct printer. The job is then redirected by SAP™ to the client as described before.

In one implementation, batch disposition management focuses on the batch approval process defined by two processes: 1) perform QA checks on produced goods; and 2) batch disposition approval. The first process involves all activities from the batch document creation to the judgment execution of the results of the check list defined in ePES 106. The batch disposition management functionalities may be supported by inspection lot creation, work list creation, results recording and batch record creation. The second process involves approval activities that check results from checklist, and supported by batch record and inspection lot functionalities (e.g., using archiving functions of batch record and usage decision options of inspection lot). The final result of batch disposition regarding the availability of the batch may be completely managed by the status of the checklist, and at any point in the process the batch disposition process may be viewed to determine the status. All activities related to the batch disposition management may be performed by the QA department, based on information provided by the quality control department and/or production department.

In one implementation, ePES 106 creates inspection lots when good receipts are posted. For each goods receipt of a process order with another batch for the header material, a new inspection lot will be created. The batch is created at an initial status defined in the Inspection lot origin. ePES 106 automatically evaluates the most important checks when user enters for the first time in the record result screen according whit the following activity: the PO Closure is conform; the RCA certificate is conform; all the sampling activities have been completed; all the sampling activities have been completed; the label reconciliation activities have been completed; all the IPCs have been completed. Each check is judged conform or not conform, after having reviewed the corresponding documentation, according to the value of the catalog assigned by the user.

In one implementation, when a quality assurance operator submits an approval and/or rejection to an approval workflow, whose purpose is to definitively approve and release the batches involved in the batch disposition (BD) document. A BD is resubmitted for approval when the BD document is rejected, so that a quality assurance operator may initiate the BD activities again and modify the BD document to create a new version of the BD document. Batch disposition may include two levels of QA approval (e.g., a first approval and a final approval). In the first level of QA approval, a QA approver may use the dedicated work list to retrieve the batches that require first level approval. The final level of QA approval, the approver may identify batches that require a final approval from the dedicated work list transaction, and access the checklist associated with a particular batch directly. In both levels of QA approval, the operator may review the batch disposition data and either approve the batch disposition or reject the batch disposition. In one implementation, storing the inspection lot with the status of a final level of QA approval causes the automatic usage decision functionality to be invoked. The usage decision functionality evaluates the 'final batch status' of the inspection lot and the batch status is modified (e.g., a stock posting may be performed in order to change the material movement status of the approved batch). The final level of QA approval may reject the 'final batch status' decision and result in ePES 106 invoking a new UD process and the post of a new goods movement, in order to return the status of an evaluated batch to a restricted status.

According to another aspect, a computer readable memory encoded with instructions may cause a data processing system to: connect through a logistics plant synchronization interface to multiple logistics plants; connect through a virtual hub interface to a centralized manufacturing collaboration hub that implements a virtual manufacturing network for the multiple logistics plants; create a material master views definition specifying: a material master view identifier for a logistics plant material master view, a virtual manufacturing network relevance identifier for the material master view identifier, and a logistic plant data copy flag for the material master view identifier; and execute a data exchange module operable to: analyze the virtual manufacturing network relevance identifier to determining whether the logistics plant material master view is relevant; and when the logistics plant material master view is relevant, analyze the logistic plant data copy flag to determine when to initiate a mirroring operation, the mirroring operation comprising synchronization of data in the logistics plant material master view and received through the logistics plant synchronization interface from an originating logistics plant from among the multiple logistics plants, with a mirrored material master view for the logistics plant material master view in the virtual manufacturing network through the virtual hub interface.

According to yet another aspect, the data exchange module may be further operable to: receive a process order request through the logistics plant synchronization interface from the originating logistics plant to initiate execution of a production activity and communicate the process order request to the virtual manufacturing network; and receive a process order release status from the virtual manufacturing network and communicate the process order release status to the originating logistics plant.

According to yet another aspect, the data exchange module may be further operable to: receive an additional material request from the virtual manufacturing network and communicate the additional material request to a selected logistics plant from among the multiple logistics plants.

According to yet another aspect, the data exchange module may be further operable to: receive materials movement information from the originating logistics plant and communicate the materials movement information to the virtual manufacturing network.

According to yet another aspect, the data exchange module may be further operable to: receive material-to-return-to-warehouse information from the virtual manufacturing network and communicate the material-to-return-to-warehouse information to a selected logistics plant from among the multiple logistics plants.

According to yet another aspect, the data exchange module may be further operable to: receive materials consumption information from virtual manufacturing network and communicate the materials consumption information to a selected logistics plant from among the multiple logistics plants; and receive final goods receipt information from the virtual manufacturing network and communicate the final goods receipt information to the selected logistics plant.

According to yet another aspect, the data exchange module may be further operable to: receive an operation confirmation process order closure status from the virtual manufacturing network and communicate the operation confirmation process order closure status to a selected logistics plant from among the multiple logistics plants.

Selected aspects, features, and components of the implementations described above are depicted as stored in memories. However, all or part of the data exchange systems, including logic (such as computer executable instructions) for implementing the methods, may be stored on, distributed across, or read from a wide variety of machine or computer-readable media. The media may include storage devices such as hard disks, flash memory, floppy disks, and CD-ROMs, or other forms of ROM or RAM either currently known or later developed. The logic may also be encoded in a transitory or non-transitory signal that encoded the logic as the signal propagates from a source to a destination.

The logic that implements the data exchange system may include any combination of hardware and software, which may vary widely in implementation. For example, a processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The functionality of the data exchange system may be distributed among multiple computer systems. Parameters, databases, and other data structures may be separately stored and managed, may be incorporated into a single memory or database, or may be logically and physically organized in many different ways.

Any of the logic described may be implemented with programs that are parts of a single program, as separate programs, or distributed across several memories and processors. The logic may be organized into software libraries, including dynamic link libraries (DLLs), application programming interfaces (APIs), or other libraries.

The invention claimed is:

1. A data exchange system comprising:
a processor;
a logistics plant synchronization interface operable to connect to multiple logistics plants;
a virtual hub interface operable to connect to a centralized manufacturing collaboration hub that implements a virtual manufacturing network for the multiple logistics plants;
a memory comprising:
a material master views definition that identifies data fields to be synchronized between the multiple logistics plants and the virtual manufacturing network, wherein the multiple logistics plants store different data fields than data fields stored by the virtual manufacturing network, the material master views definition comprising a data structure for a logistic plant material master view, comprising:
an identifier data field as a material master view identifier for the logistics plant material master view;
a separate identifier data field as a virtual manufacturing network relevance identifier for the material master view identifier indicative of the logistics plant material master view being part of the data fields stored by the virtual manufacturing network; and
a flag data field as a logistic plant data copy flag for the material master view identifier indicative of synchronization of the logistics plant material master view and the virtual manufacturing network, wherein the material master views definition facilitates a mirroring operation between the virtual manufacturing network and the multiple logistics plants; and data exchange circuitry operable to:
access the virtual manufacturing network relevance identifier in the material master views definition; and
determine that a material master view of a particular logistics plant among the multiple logistics plant is relevant to the virtual manufacturing network by analyzing the virtual manufacturing network relevance identifier in the material master views definition, the virtual manufacturing network relevance identifier corresponding to the material master view;
wherein the virtual manufacturing network relevance identifier indicates whether the mirroring operation is to be performed for the material master view;
determine that the material master view of the particular logistics plant has the logistic plant data copy flag set in the material master views definition;
insert a communication hook at an injection point in a procedure of the particular logistics plant, the communication hook comprising a modification of the procedure of the particular logistics plant to include messaging instructions that establish a communication channel between the data exchange circuitry and the particular logistics plant; and
initiate the mirroring operation for the material master view responsive to both the logistic plant data copy flag being set and the material master view being relevant, wherein the mirroring operation is initiated via the communication hook in the procedure of the particular logistics plant, wherein the mirroring operation comprises:
identifying a data field in the material master view of the particular logistics plant to be synchronized with the virtual manufacturing network;
identifying a conversion rule associated with the data field; and
synchronizing data from the data field of the material master view of the particular logistics plant, through the data exchange system, to a mirrored material master view in the virtual manufacturing network that corresponds to the material master view in the particular logistics plant, according to the conversion rule.

2. The data exchange system of claim 1, wherein the memory further comprises:
a data conversion specifier operable to direct the data exchange circuitry to implement a specified data conversion during the mirroring operation.

3. The data exchange system of claim 1, wherein the data exchange circuitry comprises:
process order creation logic configured to receive a process order request through the logistics plant synchronization interface from the particular logistics plant to initiate execution of a production activity and communicate the process order request to the virtual manufacturing network; and
process order release request logic configured to receive a process order release status from the virtual manufacturing network and communicate the process order release status to the particular logistics plant.

4. The data exchange system of claim 1, wherein the data exchange circuitry comprises: additional material transfer logic configured to receive an additional material request from the virtual manufacturing network and further configured to communicate the additional material request to a selected logistics plant from among the multiple logistics plants.

5. The data exchange system of claim 1, wherein the data exchange circuitry comprises:
dynamic bins logic configured to receive materials movement information from the particular logistics plant and further configured to communicate the materials movement information to the virtual manufacturing network.

6. The data exchange system of claim 1, wherein the data exchange circuitry comprises:
material return logic that is configured to receive material-to-return-to-warehouse information from the virtual manufacturing network and further configured to communicate the material-to-return-to-warehouse information to a selected logistics plant from among the multiple logistics plants; and
material consumption transfer logic that receives materials consumption information from the virtual manufacturing network and further configured to communicate the materials consumption information to the selected logistics plant from among the multiple logistics plants; and
stock transfer logic that receives final goods receipt information from the virtual manufacturing network and communicates the final goods receipt information to the selected logistics plant.

7. The data exchange system of claim 1, wherein the data exchange circuitry comprises: operation confirmation data transfer logic that receives an operation confirmation process order closure status from the virtual manufacturing network and communicates the operation confirmation process order closure status to a selected logistics plant from among the multiple logistics plants.

8. A data exchange method comprising:
  connecting through a logistics plant synchronization interface to multiple logistics plants through a network using an interface comprising a network adapter;
  connecting through a virtual hub interface to a centralized manufacturing collaboration hub that implements a virtual manufacturing network for the multiple logistics plants, the virtual manufacturing network using the network to connect through the virtual hub interface;
  creating a material master views definition in a non-transitory memory using a processor coupled to the non-transitory memory, wherein the material master views definition facilitates a mirroring operation by sharing the material master views definition with the multiple logistics plants, the material master views definition comprising a data structure for a logistic plant material master view, comprising:
    an identifier data field as a material master view identifier for the logistics plant material master view,
    a separate identifier data field as a virtual manufacturing network relevance identifier for the material master view identifier; and
    a flag data field as a logistic plant data copy flag for the material master view identifier; and
  executing a data exchange module in the non-transitory memory, using the processor, the data exchange module operable to:
    share the material master views definition with the multiple logistics plants;
    analyze the virtual manufacturing network relevance identifier corresponding to a material master view of an identified logistics plant among the multiple logistics plants;
    determine, based on the virtual manufacturing network relevance identifier, that the material master view of the identified logistics plant is relevant to the virtual manufacturing network and that the mirroring operation is to be performed for the material master view;
    determine that the material master view of the identified logistics plant has the logistic plant data copy flag set in the material master views definition;
    insert a communication hook at an injection point in an operation of the identified logistics plant, the communication hook comprising messaging instructions that modify the operation of the identified logistics plant to establish a communication channel between the data exchange module and the identified logistics plant; and
    initiate the mirroring operation for the material master view via the communication hook, responsive to both, the data copy flag being set, and the material master view being relevant, the mirroring operation comprising:
      identification of a data field in the material master view of the identified logistics plant to be synchronized with the virtual manufacturing network;
      identification of a conversion rule associated with the data field; and
      synchronization of data in the data field of the material master view of the identified logistics plant with a mirrored material master view in the virtual manufacturing network, the mirrored material master view corresponding to the material master view of the identified logistics plant.

9. The data exchange method of claim 8, wherein executing the data exchange module is further operable to:
  receive a process order request through the logistics plant synchronization interface from the identified logistics plant to initiate execution of a production activity and communicate the process order request to the virtual manufacturing network; and
  receive a process order release status from the virtual manufacturing network and communicate the process order release status to the identified logistics plant.

10. The data exchange method of claim 8, wherein executing the data exchange module is further operable to:
  receive an additional material request from the virtual manufacturing network; and
  communicate the additional material request to a selected logistics plant from among the multiple logistics plants.

11. The data exchange method of claim 8, wherein executing the data exchange module is further operable to:
  receive materials movement information from the identified logistics plant and communicate the materials movement information to the virtual manufacturing network.

12. The data exchange method of claim 8, wherein executing the data exchange module is further operable to:
  receive material-to-return-to-warehouse information from the virtual manufacturing network; and
  communicate the material-to-return-to-warehouse information to a selected logistics plant from among the multiple logistics plants.

13. The data exchange method of claim 8, wherein executing the data exchange module is further operable to:
  receive materials consumption information from the virtual manufacturing network and communicate the materials consumption information to a selected logistics plant from among the multiple logistics plants; and
  receive final goods receipt information from the virtual manufacturing network and communicate the final goods receipt information to the selected logistics plant.

14. The data exchange method of claim 8, wherein executing the data exchange module is further operable to:
  receive an operation confirmation process order closure status from the virtual manufacturing network; and
  communicate the operation confirmation process order closure status to a selected logistics plant from among the multiple logistics plants.

15. A non-transitory computer readable-medium comprising:
  a memory; and
  instructions stored in the memory for execution by a processor, the instructions configured to:
    connect a data exchange system, through a logistics plant synchronization interface, to multiple logistics plants;
    connect, the data exchange system, through a virtual hub interface, to a centralized manufacturing collaboration hub that implements a virtual manufacturing network for the multiple logistics plants;
    create a material master views definition comprising a data structure for a logistic plant material master view, comprising:
      an identifier data field as a material master view identifier for the logistics plant material master view,
      a separate identifier data field as a virtual manufacturing network relevance identifier corresponding to the material master view identifier, and a flag data field as a logistic plant data copy flag corresponding to the material master view identifier; and execute a data exchange module operable to:

access the virtual manufacturing network relevance identifier for a logistics plant from the multiple logistics plants; analyze the virtual manufacturing network relevance identifier to determine that the material master view of the logistics plant is a candidate for a mirroring operation;

determine that the logistic plant data copy flag corresponding to the material master view of the logistics plant, in the material master views definition, is set;

insert a communication hook at an injection point in a procedure of the logistics plant, the communication hook comprising messaging instructions that modify the procedure of the logistics plant to establish a communication channel between the data exchange module and the logistics plant and;

initiate, via the communication hook, the mirroring operation responsive to both, the virtual manufacturing network relevance identifier and the logistic plant data copy flag, the mirroring operation comprising:

identification of a data field in the material master view of the logistics plant to be synchronized with the virtual manufacturing network;

identification of a conversion rule associated with the data field; and synchronization of data in the data field of the material master view of the logistics plant to a mirrored material master view for the material master view of the logistics plant in the virtual manufacturing network, wherein the data for synchronization is received through the logistics plant synchronization interface from the logistics plant and communicated to the virtual manufacturing network through the virtual hub interface.

16. The non-transitory computer-readable medium of claim 15, wherein the data exchange module is further operable to:

receive a process order request through the logistics plant synchronization interface from the logistics plant to initiate execution of a production activity and communicate the process order request to the virtual manufacturing network; and receive a process order release status from the virtual manufacturing network and communicate the process order release status to the logistics plant.

17. The non-transitory computer-readable medium of claim 15, wherein the data exchange module is further operable to:

receive an additional material request from the virtual manufacturing network; and communicate the additional material request to a selected logistics plant from among the multiple logistics plants.

18. The non-transitory computer-readable medium of claim 15, wherein the data exchange module is further operable to:

receive materials movement information from the logistics plant and communicate the materials movement information to the virtual manufacturing network.

19. The non-transitory computer-readable medium of claim 15, wherein the data exchange module is further operable to:

receive material-to-return-to-warehouse information from the virtual manufacturing network; and communicate the material-to-return-to-warehouse information to a selected logistics plant from among the multiple logistics plants.

20. The non-transitory computer-readable medium of claim 15, wherein the data exchange module is further operable to:

receive materials consumption information from the virtual manufacturing network and communicate the materials consumption information to a selected logistics plant from among the multiple logistics plants; and receive final goods receipt information from the virtual manufacturing network and communicate the final goods receipt information to the selected logistics plant.

21. The non-transitory computer-readable medium of claim 15, wherein the data exchange module is further operable to:

receive an operation confirmation process order closure status from the virtual manufacturing network; and communicate the operation confirmation process order closure status to a selected logistics plant from among the multiple logistics plants.

* * * * *